(12) United States Patent
Park et al.

(10) Patent No.: US 12,535,908 B2
(45) Date of Patent: Jan. 27, 2026

(54) ELECTRONIC DEVICE

(71) Applicant: SAMSUNG DISPLAY CO., LTD., Yongin-si (KR)

(72) Inventors: Jungmok Park, Yongin-si (KR); Min-Hong Kim, Yongin-si (KR); Mi-Ae Park, Yongin-si (KR); Bogeun Yuk, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/632,222

(22) Filed: Apr. 10, 2024

(65) Prior Publication Data

US 2025/0036227 A1 Jan. 30, 2025

(30) Foreign Application Priority Data

Jul. 24, 2023 (KR) ........................ 10-2023-0095868

(51) Int. Cl.
*G06F 3/041* (2006.01)
*G06F 3/044* (2006.01)
*H03B 5/00* (2006.01)
*H10K 59/40* (2023.01)

(52) U.S. Cl.
CPC .......... *G06F 3/0416* (2013.01); *G06F 3/0446* (2019.05); *G06F 3/0412* (2013.01); *G06F 3/0445* (2019.05); *G06F 2203/04111* (2013.01); *H03B 5/00* (2013.01); *H10K 59/40* (2023.02)

(58) Field of Classification Search
CPC .... G06F 3/0412; G06F 3/0416; G06F 3/0445; G06F 3/0446; G06F 2203/04111; G06F 3/044; G06F 3/0443; G06F 1/1643; G06F 1/1652; G06F 3/04164; G06F 3/0441; G06F 3/0442; G06F 3/0488; G06F 3/04883; H03B 5/00; H03B 5/32; H10K 59/40; G09G 3/3208; G09G 3/32; H04M 1/0214; H04M 1/724
USPC ........................................ 345/156, 173, 174
See application file for complete search history.

(56) References Cited

U.S. PATENT DOCUMENTS

| | | | | |
|---|---|---|---|---|
| 5,528,002 A | * | 6/1996 | Katabami | G06F 3/0442 178/20.01 |
| 6,329,884 B1 | * | 12/2001 | Tsukagoshi | H03B 5/06 331/109 |
| 6,798,301 B1 | * | 9/2004 | Balan | H03B 5/366 331/109 |

(Continued)

FOREIGN PATENT DOCUMENTS

| | | | | |
|---|---|---|---|---|
| JP | 2005094147 A | * | 4/2005 | |
| JP | 2007266911 A | * | 10/2007 | H03B 5/364 |

(Continued)

*Primary Examiner* — Julie Anne Watko
(74) *Attorney, Agent, or Firm* — F. CHAU & ASSOCIATES, LLC

(57) ABSTRACT

An electronic device includes a display panel, an input sensor, and a flexible circuit film that includes a sensor controller that drives the input sensor, and an oscillation circuit. The oscillation circuit includes a quartz oscillator connected to the sensor controller, a first electrode connected to a first terminal of the quartz oscillator, and a second electrode disposed in a different layer from the first electrode and that overlaps the first electrode. The first electrode and the second electrode constitute a first capacitor.

20 Claims, 15 Drawing Sheets

(56) References Cited

U.S. PATENT DOCUMENTS

| | | | |
|---|---|---|---|
| 6,819,195 B1* | 11/2004 | Blanchard | H03B 5/06 331/173 |
| 8,816,786 B2* | 8/2014 | Tham | H03B 5/06 331/109 |
| 10,241,597 B2 | 3/2019 | Jung et al. | |
| 11,363,718 B2 | 6/2022 | Lee et al. | |
| 11,612,052 B2 | 3/2023 | Lee et al. | |
| 2010/0170726 A1* | 7/2010 | Yeh | G06F 3/03545 178/19.03 |
| 2010/0214035 A1* | 8/2010 | Terada | H03B 5/368 331/167 |
| 2014/0035689 A1* | 2/2014 | Ozawa | H03B 5/36 331/158 |
| 2015/0071394 A1* | 3/2015 | Miyanaga | H03B 5/366 375/362 |
| 2015/0130734 A1* | 5/2015 | Chang | G06F 3/0446 345/173 |
| 2015/0145611 A1* | 5/2015 | Ito | H03B 5/366 331/116 R |
| 2017/0170784 A1* | 6/2017 | Huang | H03B 5/362 |
| 2019/0305727 A1* | 10/2019 | Oomori | H03B 5/364 |
| 2019/0305786 A1* | 10/2019 | Zhang | H03K 3/012 |
| 2022/0004303 A1* | 1/2022 | Kakinoki | G06F 3/0446 |
| 2023/0185398 A1 | 6/2023 | Junghak et al. | |

FOREIGN PATENT DOCUMENTS

| | | | | |
|---|---|---|---|---|
| JP | 2008205656 A | * | 9/2008 | H03B 5/32 |
| JP | 2013211654 A | * | 10/2013 | |
| KR | 10-1405265 B1 | | 6/2014 | |
| KR | 10-2021-0051346 A | | 5/2021 | |
| KR | 10-2022-0014396 A | | 2/2022 | |
| KR | 10-2456350 B1 | | 10/2022 | |
| KR | 10-2023-0090432 A | | 6/2023 | |

* cited by examiner

ELECTRONIC DEVICE

CROSS-REFERENCE TO RELATED APPLICATIONS

This application claims priority under 35 U.S.C. § 119 from Korean Patent Application No. 10-2023-0095868, filed on Jul. 24, 2023 in the Korean Intellectual Property Office, the contents of which are herein incorporated by reference in their entirety.

TECHNICAL FIELD

Embodiments of the present disclosure described herein are directed to an electronic device, and more particularly, to an oscillation circuit that senses an input device.

DISCUSSION OF THE RELATED ART

An electronic device can sense an externally received input. The external input may be received from a user. The user's input may be any one of various external inputs, such as a pen, a part of a user's physical body, light, heat, or pressure, or a combination thereof. The electronic device can recognize coordinates of a pen through an electromagnetic resonance (EMR) scheme or through an active electrostatic (AES) scheme.

SUMMARY

Embodiments of the present disclosure provide a simplified oscillation circuit that is included in an electronic device for sensing an input device, and that reduces costs of the electronic device.

According to an embodiment, an electronic device includes a display panel that displays an image, an input sensor disposed on the display panel and that senses an input from an input device, and a flexible circuit film that includes a sensor controller that drives the input sensor, and an oscillation circuit connected to the sensor controller and that generates a reference waveform that senses the input from the input device. The oscillation circuit includes a quartz oscillator that is connected to the sensor controller and that includes a first terminal and a second terminal, a first electrode connected to the first terminal of the quartz oscillator, and a second electrode disposed in a different layer different from the first electrode and that overlaps the first electrode. The first electrode and the second electrode constitute a first capacitor.

The oscillation circuit may include a third electrode connected to the second terminal of the quartz oscillator, and a fourth electrode disposed in a different layer from the third electrode and that overlaps the third electrode, and the third electrode and the fourth electrode constitute a second capacitor.

The oscillation circuit may further include a dielectric interposed between the first electrode and the second electrode, and between the third electrode and the fourth electrode.

Each of the second electrode and the fourth electrode may be connected to ground.

Capacitance values of each of the first capacitor and the second capacitor may be in a range from 1 pF to 50 pF.

The first terminal of the quartz oscillator may be an input terminal that receives an input signal from the sensor controller.

The second terminal of the quartz oscillator is an output terminal that provides an output signal to the sensor controller.

According to an embodiment, an electronic device includes a display panel that displays an image, an input sensor disposed on the display panel and that senses an input from an input device, and a flexible circuit film that includes a sensor controller that drives the input sensor, and an oscillation circuit connected to the sensor controller and that generates a reference waveform that senses the input from the input device. The oscillation circuit includes a quartz oscillator connected to the sensor controller and that includes a first terminal and a second terminal, a (1-1)-th electrode connected to the first terminal of the quartz oscillator, and a (1-2)-th electrode disposed in a same layer as the (1-1)-th electrode and spaced apart from the (1-1)-th electrode on a first plane perpendicular to a first direction. The (1-1)-th electrode and (1-2)-th electrode overlap each other on a second plane parallel to the first direction and constitute a first capacitor.

The (1-1)-th electrode may include a plurality of (1-1)-th branch electrodes, the (1-2)-th electrode may include a plurality of (1-2)-th branch electrodes, and the plurality of (1-1)-th branch electrodes and the plurality of (1-2)-th branch electrodes may be spaced apart from each other and alternately arranged on the first plane.

The plurality of (1-1)-th branch electrodes and the plurality of (1-2)-th branch electrodes may overlap each other on the second plane.

The oscillation circuit may further include a (2-1)-th electrode connected to the second terminal of the quartz oscillator, and a (2-2)-th electrode disposed in a same layer as the (2-1)-th electrode and spaced apart from the (2-1)-th electrode, when viewed in a plan view. The (2-1)-th electrode and the (2-2)-th electrode may constitute a second capacitor.

Each of the (1-2)-th electrode and the (2-2)-th electrode may be connected to ground.

The oscillation circuit may further include a dielectric interposed between the (1-1)-th electrode and the (1-2)-th electrode, and between the (2-1)-th electrode and the (2-2)-th electrode.

Capacitance values of each of the first capacitor and the second capacitor may be in a range from 1 pF to 50 pF.

The first terminal of the quartz oscillator may be an input terminal that receives an input signal from the sensor controller.

The second terminal of the quartz oscillator is an output terminal that provides an output signal to the sensor controller.

According to an embodiment, an electronic device includes a display panel that displays an image, an input sensor disposed on the display panel and that senses an input from an input device, a sensor controller that drives the input sensor, a quartz oscillator connected to the sensor controller and that includes an input terminal and an output terminal, a first capacitor connected to the input terminal of the quartz oscillator, a second capacitor connected to the output terminal of the quartz oscillator, and a ground. The first capacitor includes a first electrode connected to the input terminal and a second electrode connected to the ground, and the second capacitor includes a third electrode connected to the output terminal and a fourth electrode connected to the ground.

The first electrode and the second electrode may be disposed in mutually different layers and overlap in a plan view, and the third electrode and the fourth electrode may be disposed in mutually different layers and overlap each other when viewed in in a plan view.

The first electrode and the second electrode may be disposed in a same layer and spaced apart from each other when viewed in a plan view, and the third electrode and the fourth electrode may be disposed in a same layer, and spaced apart from each other when viewed in a plan view.

Capacitance values of each of the first capacitor and the second capacitor may be in a range from 1 pF to 50 pF.

DETAILED DESCRIPTION

Figure 1:
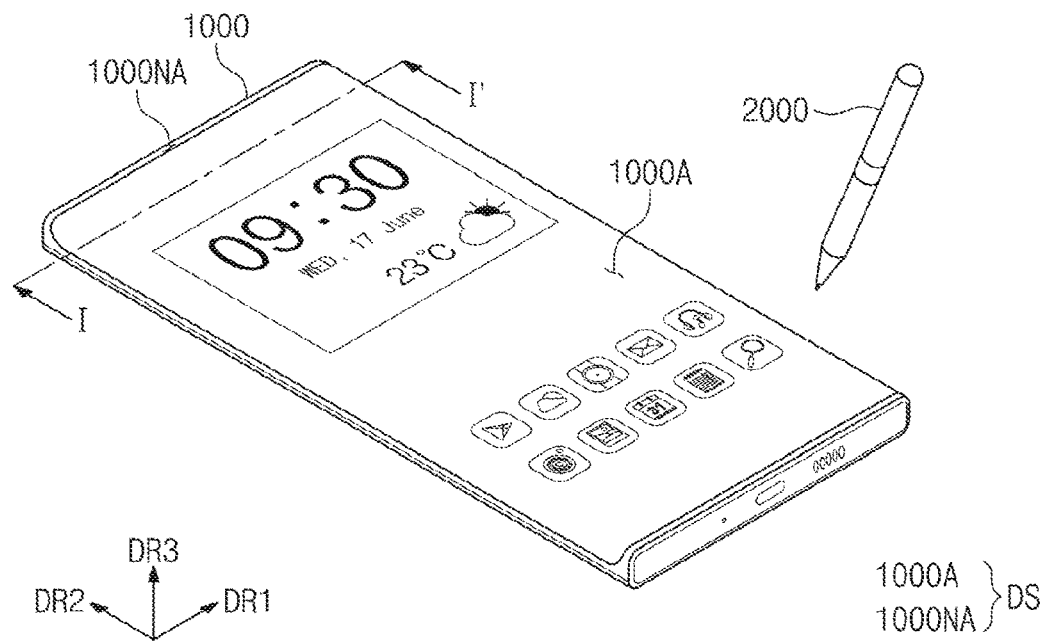
FIG. 1 is a perspective view of an electronic device and an input device, according to an embodiment of the present disclosure.

While the present disclosure is susceptible to various modifications and alternative forms, specific embodiments thereof are shown by way of example in the drawings and will be described herein in detail. It should be understood, however, that there is no intent to limit the present disclosure to the particular forms disclosed, but on the contrary, the present disclosure is to cover all modifications, equivalents, and alternatives falling within the spirit and scope of the present disclosure.

In the specification, the wording "a member is directly disposed" means that an additional layer, film, region, or plate is absent between a part, such as a layer, film, region, or plate, and another part, such as another layer, film, region, or plate.

The same reference numerals may be assigned to the same elements in drawings.

Hereinafter, embodiments of the present disclosure will be described with reference to accompanying drawings.

FIG. 1 is a perspective view of an electronic device and an input device, according to an embodiment of the present disclosure.

Referring to FIG. 1, in an embodiment, an electronic device 1000 can be activated in response to an electrical signal. For example, the electronic device 1000 may be a cellular phone, a tablet PC, a car navigation system, a game console, or a wearable device, but is not necessarily limited thereto. FIG. 1 shows that the electronic device 1000 is a cellular phone by way of example.

The electronic device 1000 includes a display surface DS that is parallel to a first direction DR1 and a second direction DR2 that crosses the first direction DR1. The display surface DS of the electronic device 1000 includes an active region 1000A and a peripheral region 1000NA. The electronic device 1000 displays an image through the active region 1000A. The peripheral region 1000NA surrounds the active region 1000A.

A thickness direction of the electronic device 1000 is parallel to a third direction DR3 that crosses the first direction DR1 and the second direction DR2. Accordingly, front surfaces (or top surfaces) and rear surfaces (or bottom surfaces) of members of the electronic device 1000 may be defined based on the third direction DR3.

The electronic device 1000 can sense inputs that are externally applied thereto. The external inputs can include any one of various external inputs, such as a pen, a part of a user's physical body, light, heat, or pressure, or the combination thereof.

The electronic device 1000 illustrated in FIG. 1 can sense an input made by the touch of a user and an input by an input device 2000. The input device 2000 may be referred to a device in addition to the user's physical body. The input made by the input device 2000 may be referred to as a first input, and the input made by the user's touch may be referred to a second input. For example, the input device 2000 may be an active pen, a stylus pen, a touch pen, or an electronic pen. Hereinafter, an active pen that operates as the input device 2000 will be described by way of example.

The electronic device 1000 and the input device 2000 make bidirectional communication. The electronic device 1000 provides an uplink signal to the input device 2000. For example, the uplink signal includes a synchronization signal or information on the electronic device 1000, but embodiments of the present disclosure are not necessarily limited thereto. The input device 2000 provides a downlink signal to the electronic device 1000. The downlink signal includes a synchronization signal or information on the state of the input device 2000. For example, the downlink signal includes information on the coordinates of the input device 2000, information on a battery of the input device 2000, information on the tilting of the input device 2000, and/or various other information stored in the input device 2000. However, embodiments of the present disclosure are not necessarily limited thereto. The uplink signal and the downlink signal will be described below.

Figure 2:
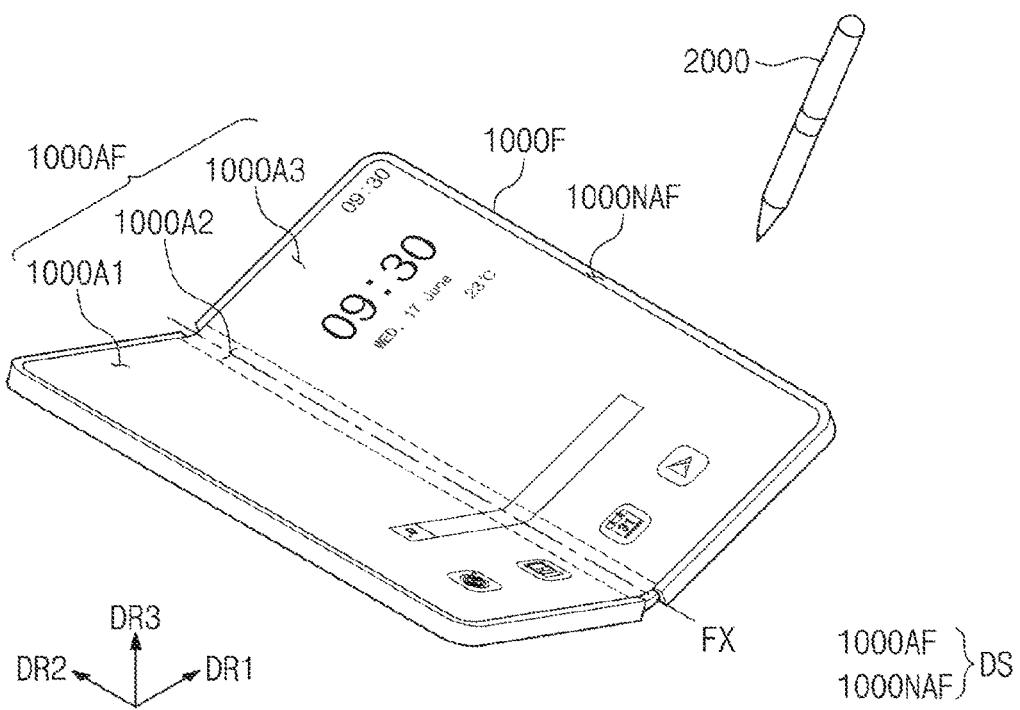
FIG. 2 is a perspective view of an electronic device and an input device according to an embodiment of the present disclosure.

FIG. 2 is a perspective view of an electronic device and an input device, according to an embodiment of the present disclosure. In the following description made with reference to FIG. 2, components described with reference to FIG. 1 have the same reference numerals, and a repeated description thereof may be omitted.

Referring to FIG. 2, in an embodiment, an electronic device 1000F displays an image through an active region 1000AF. FIG. 2 illustrates a state in which the electronic device 1000F is folded at an angle.

When the electronic device 1000F is unfolded, the electronic device 1000F has the display surface DS parallel to the first direction DR1 and the second direction DR2. The active region 1000AF and a peripheral region 1000NAF adjacent thereto are defined on the display surface DS of the electronic device 1000F.

The active region 1000AF includes a first active region 1000A1, a second active region 1000A2, and a third active region 1000A3. The first active region 1000A1, the second active region 1000A2, and the third active region 1000A3 are sequentially defined in the first direction DR1. The second active region 1000A2 can be bent with respect to a folding axis FX that extends in the second direction DR2. Accordingly, the first active region 1000A1 and the third active region 1000A3 may be referred to as non-foldable regions, and the second active region 1000A2 may be referred to as a foldable region.

When the electronic device 1000F is folded in an in-folding operation, the first active region 1000A1 and the third active region 1000A3 face each other. Therefore, in a completely folded state, the active region 1000AF is not externally exposed, which is referred to as an in-folded state. However, embodiments are not necessarily limited thereto.

For example, according to an embodiment of the present disclosure, when the electronic device 1000F is folded in an out-folding operation, the first active region 1000A1 and the third active region 1000A3 are opposite to each other. Therefore, in a folded state, the active region 1000AF is externally exposed, which is referred to as an out-folded state.

In an embodiment, the electronic device 1000F performs only one of the in-folding operation or the out-folding operation. In an embodiment, the electronic device 1000F performs both the in-folding operation and the out-folding operation. For example, the same region, such as the second active region 1000A2 of the electronic device 1000F, can be in-folded or out-folded.

Although FIG. 2 illustrates as an example one foldable region and two non-foldable regions, the number of foldable regions and the number of non-foldable regions are not necessarily limited thereto. For example, in some embodiments, the electronic device 1000F includes more than two non-foldable regions and a plurality of foldable regions between adjacent non-foldable regions.

Although FIG. 2 shows that the folding axis FX extends in the second direction DR2, embodiments of the present disclosure are not necessarily limited thereto. In an embodiment, the folding axis FX extends in a direction parallel to the first direction DR1. For example, the first active region 1000A1, the second active region 1000A2, and the third active region 1000A3 are sequentially arranged in the second direction DR2.

The active region 1000AF overlaps at least one electronic module. For example, the electronic module is at least one of a camera module or a proximity illumination sensor. The electronic modules receive an external input through the active region 1000AF or provide an output through the active region 1000AF. A portion of the active region 1000AF that overlaps the camera module or the proximity illumination sensor has a transmittance higher than that of other portions of the active region 1000AF. Accordingly, a separate region for a plurality of electronic modules need not be provided in the peripheral region 1000NAF. Accordingly, the area ratio of the active region 1000AF to the entire surface of the electronic device 1000F can be increased, and the area ratio of the peripheral region 1000NAF can be decreased.

The electronic device 1000F and the input device 2000 perform bidirectional communication. The electronic device 1000F provides an uplink signal to the input device 2000. The input device 2000 provides a downlink signal to the electronic device 1000F. The electronic device 1000F detects coordinates of the input device 2000 using a signal received from the input device 2000.

Figure 3:
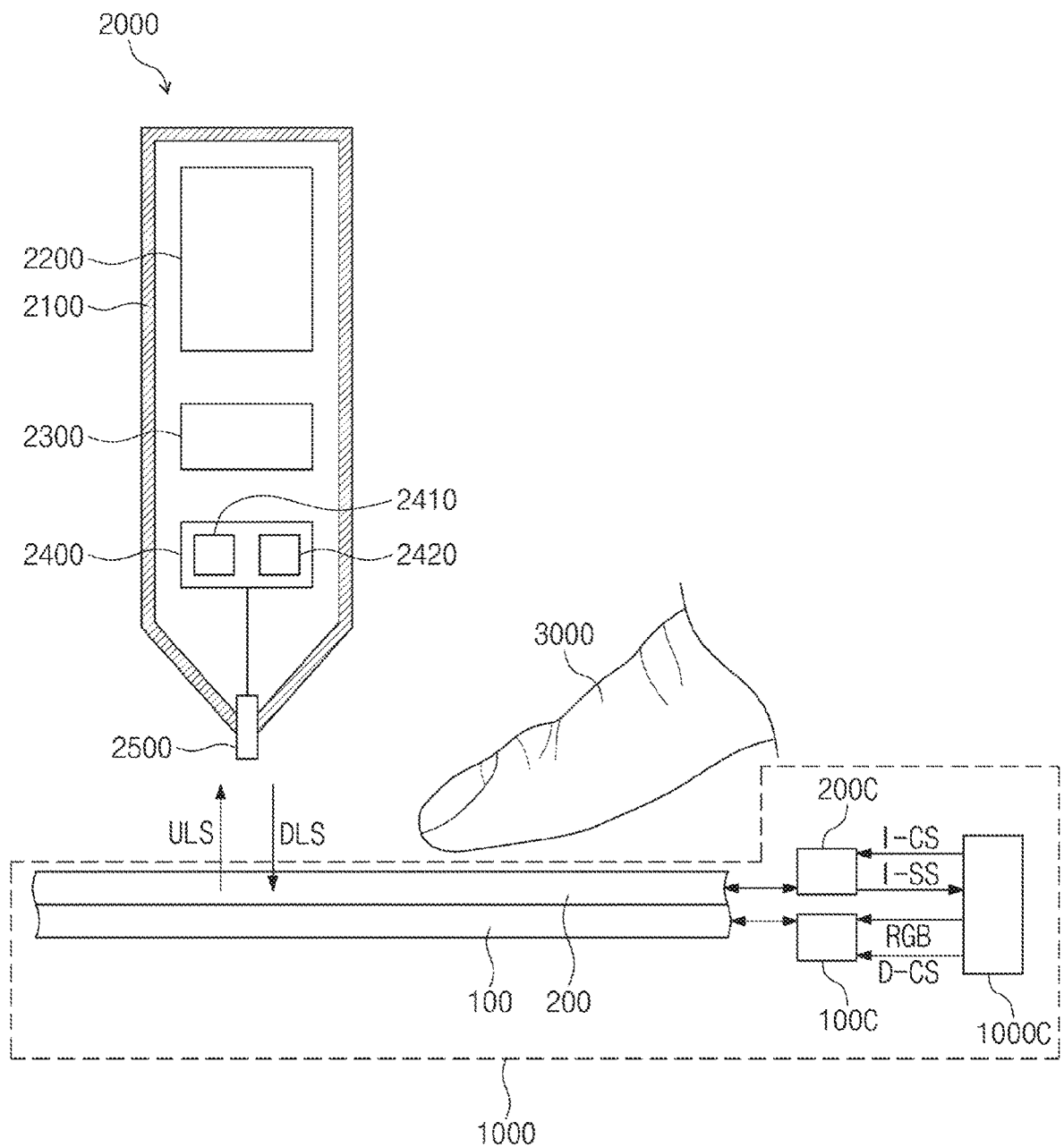
FIG. 3 is a block diagram of an electronic device and an input device according to an embodiment of the present disclosure.

FIG. 3 is a block diagram of an electronic device and an input device according to an embodiment of the present disclosure.

Referring to FIG. 3, in an embodiment, the electronic device 1000 includes a display panel 100, an input sensor 200, a panel driver 100C, a sensor controller 200C, and a main controller 1000C.

The display panel 100 generates an image. The display panel 100 is a light emitting display panel. For example, the display panel 100 is one of an organic light emitting display panel, an inorganic light emitting display panel, a quantum dot display panel, a micro-LED display panel, or a nano-LED display panel.

The input sensor 200 is disposed on the display panel 100. The input sensor 200 senses an external input. The input sensor 200 can sense a first input from the input device 2000 and a second input from a user's body 3000.

The main controller 1000C controls an overall operation of the electronic device 1000. For example, the main controller 1000C controls operations of the panel driver 100C and the sensor controller 200C. The main controller 1000C includes at least one microprocessor, and the main controller 1000C may be referred to as a host.

The panel driver 100C controls the display panel 100. The main controller 1000C may further include a graphic controller. The panel driver 100C receives an image signal RGB and a first control signal D-CS from the main controller 1000C. The first control signal D-CS includes various signals. For example, the first control signal D-CS includes a vertical synchronization signal, a horizontal synchronization signal, a main clock, and a data enable signal. The panel driver 100C generates various control signals, such as start signals and clock signals, that control the timing of signals transmitted to the display panel 100 based on the first control signal D-CS.

The sensor controller 200C controls the input sensor 200. The sensor controller 200C receives a second control signal I-CS from the main controller 1000C. The second control signal I-CS includes a mode determining signal that determines a driving mode of the sensor controller 200C and a clock signal. The sensor controller 200C can operate in a first mode that senses the first input made from the input device 2000 or a second mode that senses the second input from the user's body 3000, based on the second control signal I-CS. The sensor controller 200C controls the input sensor 200 to be in the first mode or the second mode, to be described below, based on the mode determining signal.

The sensor controller 200C calculates coordinates information of the first or second inputs based on signals received from the input sensor 200 and provides a coordinate signal I-SS that includes the coordinates information to the main controller 1000C. The main controller 1000C executes an operation that corresponds to a user input based on the coordinate signal I-SS. For example, based on the coordinate signal I-SS, the main controller 1000C operates the panel driver 100C such that a new application image is displayed on the display panel 100.

The sensor controller 200C may be referred to as a sensor driver.

The input device 2000 includes a housing 2100, a power supply 2200, a pen controller 2300, a communication module 2400, and a pen electrode 2500. However, components of the input device 2000 are not necessarily limited to those listed. For example, the input device 2000 may further include an electrode switch that switches between a signal transmitting mode or a signal receiving mode, a pressure sensor that senses pressure, a memory that stores information, or a rotation sensor that senses rotation.

The housing 2100 has a pen shape, and a receiving space is formed in the housing 2100. The power supply 2200, the pen controller 2300, the communication module 2400, and the pen electrode 2500 are received in the receiving space inside the housing 2100.

The power supply 2200 supplies power to the pen controller 2300 and the communication module 2400. The power supply 2200 may include a battery or a high-capacity capacitor.

The pen controller 2300 controls an operation of the input device 2000. The pen controller 2300 may be an application-specific integrated circuit (ASIC). The pen controller 2300 may be configured to operate according to a designed program.

The communication module 2400 includes a transmit circuit 2410 and a receive circuit 2420. The transmit circuit 2410 outputs a downlink signal DLS to the input sensor 200. The receive circuit 2420 receives a uplink signal ULS from the input sensor 200. The transmit circuit 2410 receives a signal from the pen controller 2300 and modulates the received signal into a signal that allows sensing by the input sensor 200, and the receive circuit 2420 modulates the signal received from the input sensor 200 into a signal that allows processing by the pen controller 2300.

The pen electrode 2500 is electrically connected to the communication module 2400. In an embodiment, a portion of the pen electrode 2500 protrudes from the housing 2100. In an embodiment, the input device 2000 further includes a cover housing that covers the pen electrode 2500 exposed from the housing 2100. In an embodiment, the pen electrode 2500 is embedded in the housing 2100.

Figure 4A:
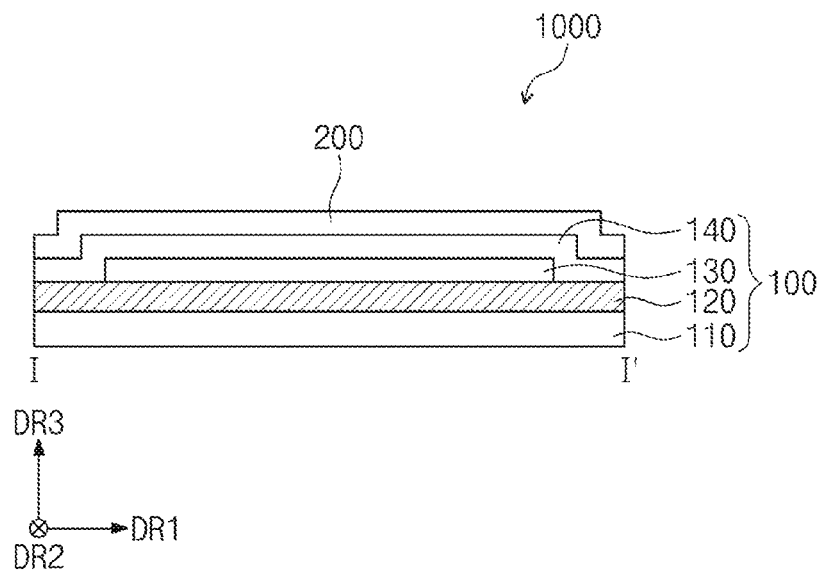
FIGS. 4A and 4B are cross-sectional views of an electronic device according to an embodiment of the present disclosure.
Figure 4B:
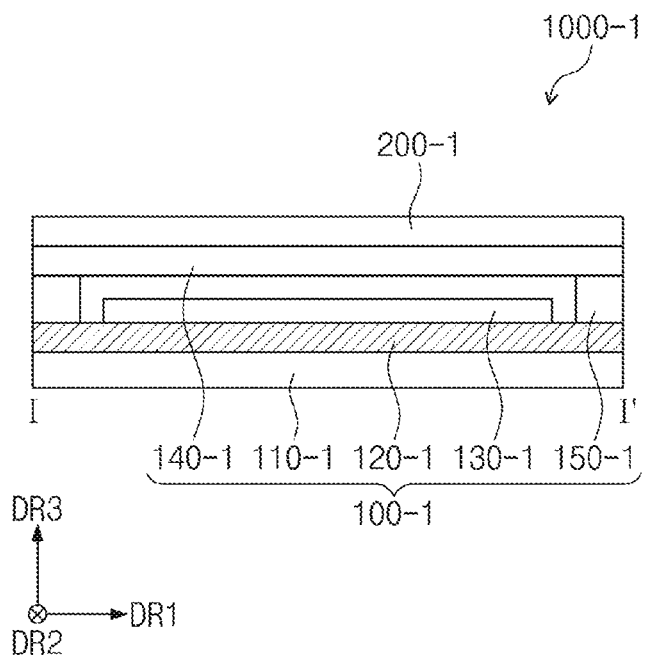

FIGS. 4A and 4B are cross-sectional views of an electronic device according to an embodiment of the present disclosure, respectively. FIGS. 4A and 4B are cross-sectional views taken along line I-I' in FIG. 1.

Referring to FIG. 4A, the electronic device 1000 includes the display panel 100 and the input sensor 200. The display panel 100 includes a base layer 110, a circuit layer 120, a light emitting element layer 130, and an encapsulating layer 140.

The base layer 110 provides a base surface on which the circuit layer 120 is disposed. The base layer 110 is one of a glass substrate, a metal substrate, or a polymer substrate. However, embodiments are not necessarily limited thereto, and the base layer 110 can be one of an inorganic layer, an organic layer, or a composite material layer.

The base layer 110 has a multilayer structure. For example, the base layer 110 includes a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as base barrier layers.

Each of the first and second synthetic resin layers includes a polyimide-based resin. In addition, each of the first and second synthetic resin layers includes at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. In the present specification, the wording "~~-based resin" means that the "~~-based resin" includes a functional group of "~~"

The circuit layer 120 is disposed on the base layer 110. The circuit layer 120 includes an insulating layer, a semiconductor pattern, a conductive pattern, and a signal line. The insulating layer, the semiconductor layer, and the conductive layer are formed on the base layer 110 through coating or deposition, and are selectively patterned through a plurality of photolithography processes. Thereafter, a semiconductor pattern, a conductive pattern, and a signal line of the circuit layer 120 are formed.

The light emitting element layer 130 is disposed on the circuit layer 120. The light emitting element layer 130 includes a light emitting element. For example, the light emitting element layer 130 is at least one of an organic light emitting material, a quantum dot, a quantum rod, a micro LED, or a nano-LED.

The encapsulating layer 140 is disposed on the light emitting element layer 130. The encapsulating layer 140 protects the light emitting element layer 130 from foreign substances such as moisture, oxygen, and dust particles.

The input sensor 200 is formed on the display panel 100 through subsequent processes. For example, the input sensor 200 is directly disposed on the display panel 100. The wording "directly disposed" means that no third component is disposed between the input sensor 200 and the display panel 100. For example, no additional adhesive member is not disposed between the input sensor 200 and the display panel 100. In another embodiment, the input sensor 200 is coupled to the display panel 100 through an adhesive member.

Referring to FIG. 4B, in an embodiment, an electronic device 1000-1 includes a display panel 100-1 and an input sensor 200-1. The display panel 100-1 includes a base substrate 110-1, a circuit layer 120-1, a light emitting element layer 130-1, an encapsulating substrate 140-1, and a coupling member 150-1. Except for the presence of the coupling member 150-1, the configuration of FIG. 4B is substantially the same as that of FIG. 4A, and thus a repeated description thereof my be omitted.

Each of the base substrate 110-1 and the encapsulating substrate 140-1 is one of a glass substrate, a metal substrate, or a polymer substrate, but embodiments of the present disclosure are not necessarily limited thereto.

The coupling member 150-1 is interposed between the base substrate 110-1 and the encapsulating substrate 140-1. A resin material may be further disposed between the light emitting element layer 130-1, the encapsulating substrate 140-1, and the coupling member 150-1. The coupling member 150-1 couples the encapsulating substrate 140-1 to the base substrate 110-1 or the circuit layer 120-1. The coupling member 150-1 includes an inorganic material or an organic material. For example, the inorganic material includes frit seals, and the organic materials includes a photocurable resin or a photoplastic resin. However, the material constituting the coupling member 150-1 is not necessarily limited to the above example.

The input sensor 200-1 is directly disposed on the encapsulating substrate 140-1. The wording "directly disposed" means that no third component is interposed between the input sensor 200-1 and the encapsulating substrate 140-1. For example, no additional adhesive member is disposed between the input sensor 200-1 and the display panel 100-1. However, embodiments of the present disclosure are not necessarily limited thereto, and in other embodiments, an adhesive layer is disposed between the input sensor 200-1 and the encapsulating substrate 140-1.

Figure 5:
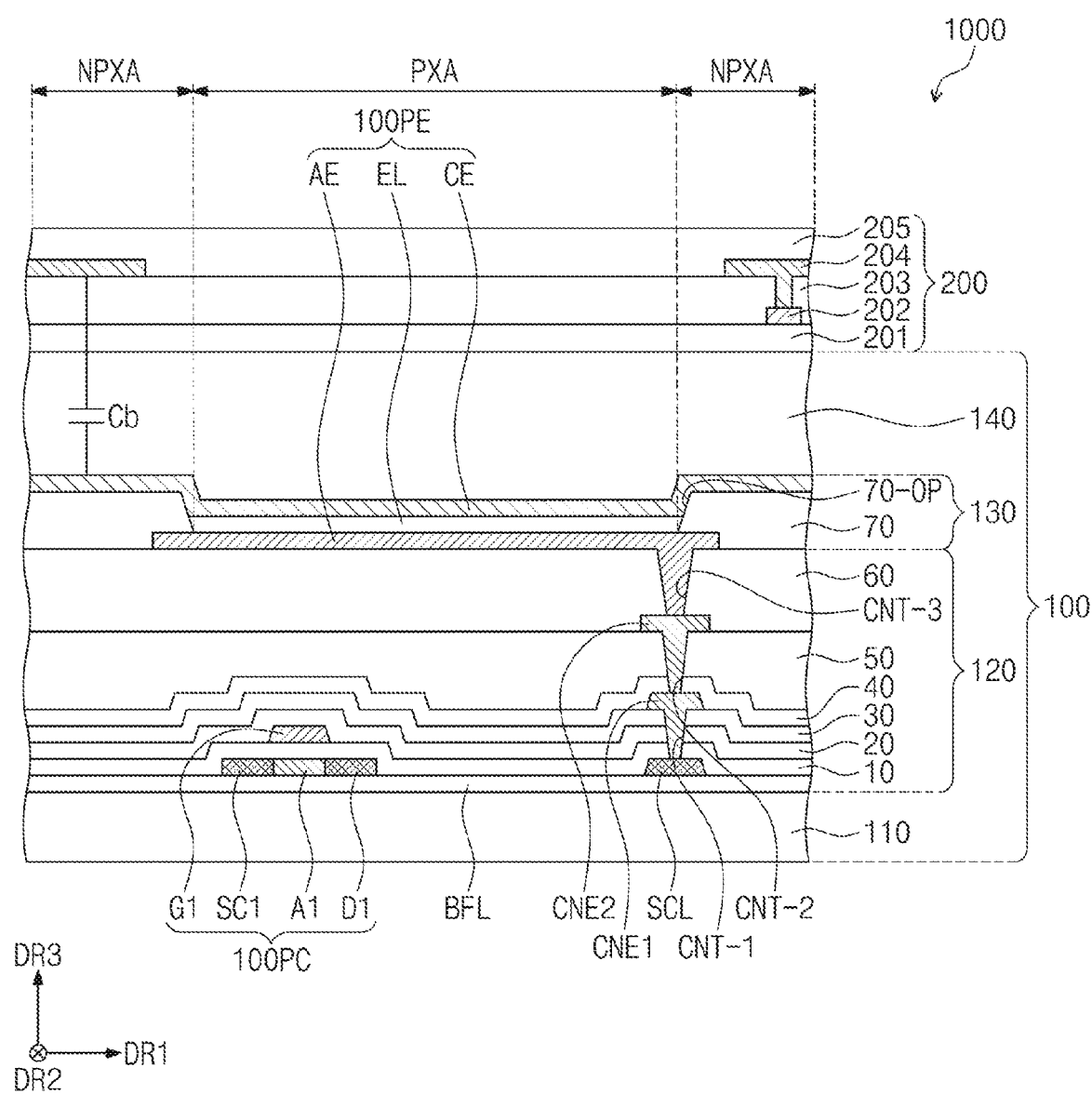
FIG. 5 is a cross-sectional view of an electronic device according to an embodiment of the present disclosure.

FIG. 5 is a cross-sectional view of an electronic device according to an embodiment of the present disclosure. In the following description made with reference to FIG. 5, those components described with reference to FIG. 4A are assigned the same reference numerals, and a repeated description thereof may be omitted.

Referring to FIG. 5, in an embodiment, at least one inorganic layer is formed on a top surface of the base layer 110. The inorganic layer includes at least one of aluminum oxide, titanium oxide, silicon oxide, silicon oxynitride, silicon nitride, zirconium oxide, or hafnium oxide. The inorganic layer has a multiple-layer structure. Multiple inorganic layers form a barrier layer and/or a buffer layer. According to an embodiment, the display panel 100 is illustrated as including a buffer layer BFL.

The buffer layer BFL improves a coupling force between the base layer 110 and the semiconductor pattern. The buffer layer BFL includes a silicon oxide layer and a silicon nitride layer, and the silicon oxide layer and the silicon nitride layer are alternately stacked.

The semiconductor pattern is disposed on the buffer layer BFL. The semiconductor pattern includes polysilicon. However, embodiments are not necessarily limited thereto, and in other embodiments, the semiconductor pattern includes at least one of amorphous silicon, low-temperature polycrystalline silicon, or oxide semiconductors.

FIG. 5 illustrates only some semiconductor patterns, and the semiconductor patterns are further disposed in other regions. The semiconductor pattern is arranged in a specific rule while crossing the pixels. The semiconductor pattern has different electrical properties that depend on whether or not the semiconductor pattern is doped. The semiconductor pattern includes a first region that has a higher conductivity and a second region that has a lower conductivity. The first region is doped with an N-type dopant or a P-type dopant. A P-type transistor includes a doping region doped with the P-type dopant, and an N-type transistor includes a doping region doped with an N-type dopant. The second region is an undoped region or is doped at a lower concentration than the first region.

The conductivity of the first region is greater than that of the second region, and serves as an electrode or a signal line. The second region corresponds to a channel region of the transistor. For example, a portion of the semiconductor pattern is a channel portion of the transistor, another portion of the semiconductor pattern is a source or drain of the transistor, and still another portion of the semiconductor pattern is a connection electrode or a connection signal line.

Each pixel has an equivalent circuit that includes seven transistors, one capacitor, and a light emitting element, and the equivalent circuit of the pixel can be transformed into various forms. In FIG. 5, one transistor 100PC and a light emitting element 100PE of a pixel are illustrated.

The transistor 100PC includes a source SC1, a channel part A1, a drain D1, and a gate G1. The source SC1, the channel part A1, and the drain D1 are formed from the semiconductor pattern. The source SC1 and the drain D1 extend in opposite directions from the channel part A1, when viewed in a cross-sectional view. FIG. 5 illustrates a portion of a connection signal line SCL formed from the semiconductor pattern. In addition, the connection signal line SCL is electrically connected to the drain D1 of the transistor 100PC, when viewed in a plan view.

A first insulating layer 10 is disposed on the buffer layer BFL. The first insulating layer 10 commonly overlaps a plurality of pixels and covers the semiconductor pattern. The first insulating layer 10 may be an inorganic layer and/or an organic layer, and may have a single layer or a multi-layer structure. The first insulating layer 10 includes at least one of aluminum oxide, titanium oxide, silicon oxide, silicon nitride, silicon oxynitride, zirconium oxide, or hafnium oxide. According to an embodiment, the first insulating layer 10 is a single-layered silicon oxide layer. In addition to the first insulating layer 10, the insulating layer of the circuit layer 120 to be described below may be an inorganic layer and/or an organic layer, and may have a single-layer or multi-layer structure. The inorganic layer includes at least one of the above-described materials, but embodiments of the present disclosure are not necessarily limited thereto.

The gate G1 is disposed on the first insulating layer 10. The gate G1 is a portion of a metal pattern. The gate G1 overlaps the channel part A1. In a process of doping the semiconductor pattern, the gate G1 functions as a mask.

A second insulating layer 20 is disposed on the first insulating layer 10 and covers the gate G1. The second insulating layer 20 commonly overlaps the pixels. The second insulating layer 20 may be an inorganic layer and/or an organic layer, and may have a single layer or a multi-layer structure. The second insulating layer 20 includes at least one of silicon oxide, silicon nitride, or silicon oxynitride. In an embodiment, the second insulating layer 20 has a multi-layer structure that includes a silicon oxide layer and a silicon nitride layer.

A third insulating layer 30 is disposed on the second insulating layer 20. The third insulating layer 30 may have a single-layer or multi-layer structure. For example, the third insulating layer 30 has a multi-layer structure that includes a silicon oxide layer and a silicon nitride layer.

A first connection electrode CNE1 is disposed on the third insulating layer 30. The first connection electrode CNE1 is connected to the connection signal line SCL through a contact hole CNT-1 that penetrates through the first, second, and third insulating layers 10, 20, and 30.

A fourth insulating layer 40 is disposed on the third insulating layer 30. The fourth insulating layer 40 covers the first connection electrode CNE1. The fourth insulating layer 40 is a single-layered silicon oxide layer. A fifth insulating layer 50 is disposed on the fourth insulating layer 40. The fifth insulating layer 50 is an organic layer.

A second connection electrode CNE2 is disposed on the fifth insulating layer 50. The second connection electrode CNE2 is connected to the first connection electrode CNE1 through a contact hole CNT-2 that penetrates through the fourth insulating layer 40 and the fifth insulating layer 50.

A sixth insulating layer 60 is disposed on the fifth insulating layer 50 and covers the second connection electrode CNE2. The sixth insulating layer 60 is an organic layer.

The light emitting element layer 130 is disposed on the circuit layer 120. The light emitting element layer 130 includes the light emitting element 100PE. For example, the light emitting element layer 130 includes at least one of an organic light emitting material, an inorganic light emitting material, a quantum dot, a quantum rod, a micro LED, or a nano-LED. Hereinafter, the light emitting element 100PE is described as an organic light emitting element, but embodiments of the present disclosure are not necessarily limited thereto.

The light emitting element 100PE includes a first electrode AE, a light emitting layer EL, and a second electrode CE. The first electrode AE is disposed on the sixth insulating layer 60. The first electrode AE is connected to the second connection electrode CNE2 through a contact hole CNT-3 that penetrates through the sixth insulating layer 60.

A pixel defining layer 70 is disposed on the sixth insulating layer 60 and covers a portion of the first electrode AE. An opening 70-OP is formed in the pixel defining layer 70. The opening 70-OP of the pixel defining layer 70 exposes at least a portion of the first electrode AE.

The active region 1000A (see FIG. 1) includes a light emitting region PXA and a non-light emitting region NPXA adjacent to the light emitting region PXA. The non-light emitting region NPXA surrounds the light emitting region PXA. According to an embodiment, the light emitting region PXA corresponds to the partial region of the first electrode AE exposed by the opening 70-OP.

The light emitting layer EL is disposed on the first electrode AE. The light emitting layer EL is disposed in a region that corresponds to the opening 70-OP. For example, the light emitting layer EL is formed separately for each of the pixels. When the light emitting layer EL is formed separately for each of the pixels, each of the light emitting layers EL emits at least one of blue, red, or green light. However, embodiments of the present disclosure are not necessarily limited thereto, and in other embodiments, the light emitting layer EL is connected in common to all of the pixels. For example, the light emitting layer EL emits blue light or white light.

The second electrode CE is disposed on the light emitting layer EL. The second electrode CE has an integral shape and is commonly disposed for all of the plurality of pixels.

In addition, a hole control layer is disposed between the first electrode AE and the light emitting layer EL. The hole control layer is commonly disposed in the light emitting region PXA and the non-light emitting region NPXA. The hole control layer includes a hole transport layer, and further includes a hole injection layer. An electronic control layer is interposed between the light emitting layer EL and the second electrode CE. The electronic control layer includes an electron transport layer, and further includes an electron injection layer. The hole control layer and the electronic control layer are commonly formed for all of the plurality of pixels using an open mask.

The encapsulating layer 140 is disposed on the light emitting element layer 130. The encapsulating layer 140 includes an inorganic layer, an organic layer, and an inorganic layer sequentially stacked, but the layers of the encapsulating layer 140 are not necessarily limited thereto.

The inorganic layers protect the light emitting element layer 130 from moisture and oxygen, and the organic layer protects the light emitting element layer 130 from foreign substances such as dust particles. The inorganic layers include at least one of a silicon nitride layer, a silicon oxynitride layer, a silicon oxide layer, a titanium oxide layer, or an aluminum oxide layer. The organic layer includes an acrylic organic layer, but is not necessarily limited thereto.

The input sensor 200 is formed on the display panel 100 through subsequent processes. For example, the input sensor 200 is directly disposed on the display panel 100. The wording "directly disposed" means that a third component is not interposed between the input sensor 200 and the display panel 100. For example, no a separate adhesive member is disposed between the input sensor 200 and the display panel 100. However, in some embodiments, the input sensor 200 is coupled to the display panel 100 through an adhesive member.

The input sensor 200 includes a base insulating layer 201, a first conductive layer 202, a sensing insulating layer 203, a second conductive layer 204, and a cover insulating layer 205.

The base insulating layer 201 is an inorganic layer that includes at least one of silicon nitride, silicon oxynitride, or silicon oxide. However, in some embodiments, the base insulating layer 201 is an organic layer that includes at least one of an epoxy resin, an acrylic resin, or an imide-based resin. The base insulating layer 201 may have a single layer structure or a multi-layer structure stacked in the third direction DR3.

Each of the first conductive layer 202 and the second conductive layer 204 may have a single-layer structure or a multi-layer structure stacked in the third direction DR3.

A single layer conductive layer includes a metal layer or a transparent conductive layer. The metal layer includes at least one of molybdenum, silver, titanium, copper, aluminum, or an alloy thereof. The transparent conductive layer includes a transparent conductive oxide such as at least one of indium tin oxide (ITO), indium zinc oxide (IZO), zinc oxide (ZnO), or indium zinc oxide (IZTO). In addition, the transparent conductive layer may include a conductive polymer such as PEDOT, a metal nanowire, graphene, etc.

The conductive layer in the multi-layer structure includes metal layers. The metal layers may have, for example, a three-layer structure of titanium/aluminum/titanium. A multi-layered conductive layer includes at least one metal layer and at least one transparent conductive layer.

At least one of the sensing insulating layer 203 or the cover insulating layer 205 includes an inorganic layer. The inorganic layer includes at least one of aluminum oxide, titanium oxide, silicon oxide, silicon nitride, silicon oxynitride, zirconium oxide, or hafnium oxide.

At least one of the sensing insulating layer 203 or the cover insulating layer 205 includes an organic layer. The organic layer includes at least one of an acrylic resin, a methacrylic resin, a polyisoprene, a vinyl resin, an epoxy resin, a urethane resin, a cellulose resin, a siloxane resin, a polyimide resin, or a perylene resin.

A parasitic capacitance Cb is generated between the input sensor 200 and the second electrode CE. As the distance between the input sensor 200 and the second electrode CE is reduced, the value of the parasitic capacitance Cb increases. As the parasitic capacitance Cb increases, the change in the reference capacitance value decreases. The change in capacitance means a change in capacitance that occurs before and after input by an input device, such as the input device 2000, (see FIG. 3) or the user's body 3000 (see FIG. 3).

The sensor controller 200C (see FIG. 3) that processes the signal sensed by the input sensor 200 performs a leveling operation to remove a value that corresponds to the parasitic capacitance Cb from the sensed signal. A change in a ratio of the capacitance to the reference value is increased through the leveling operation, thereby increasing sensing sensitivity.

Figure 6:
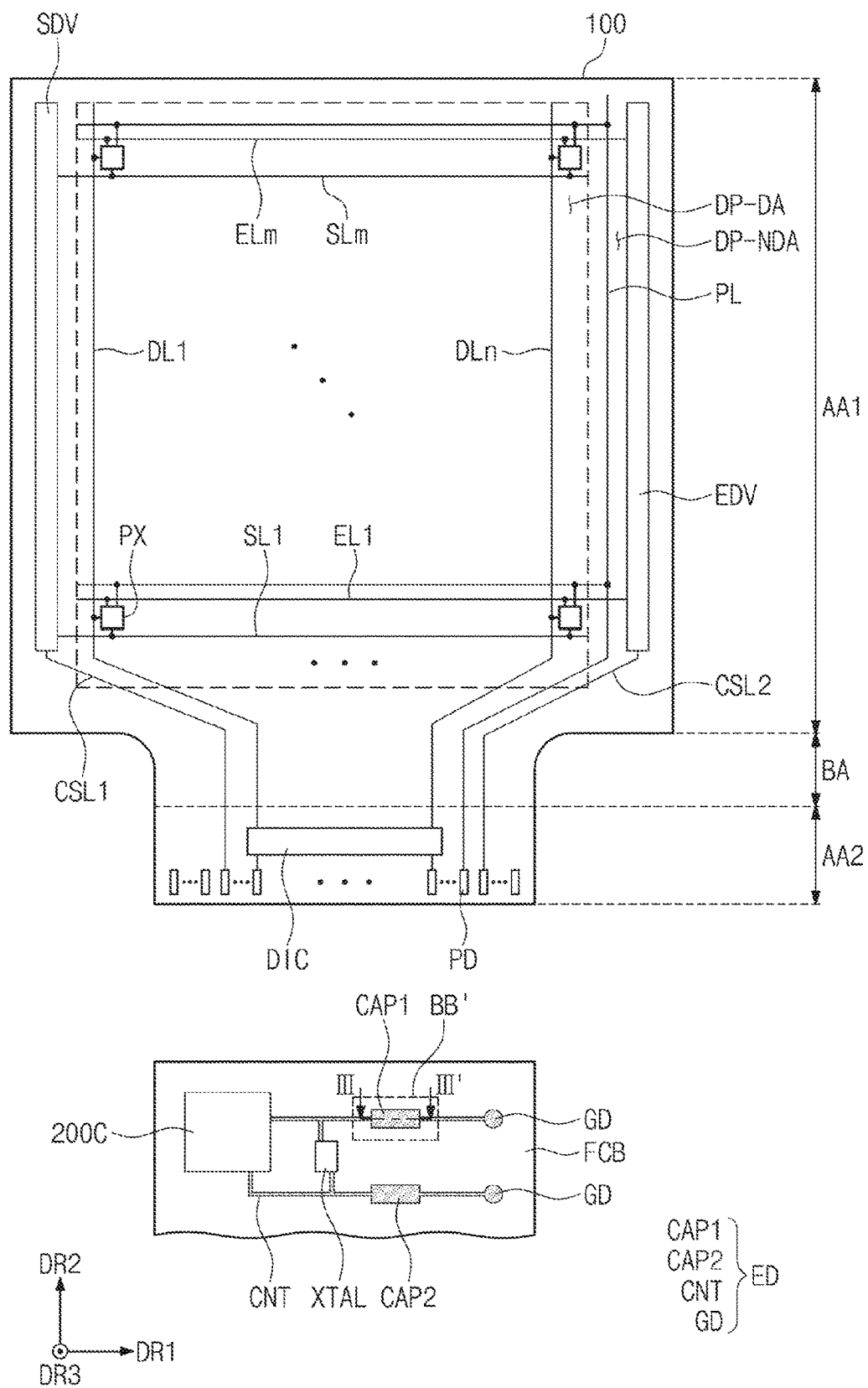
FIG. 6 is a plan view of a display panel according to an embodiment of the present disclosure.
Figure 7:
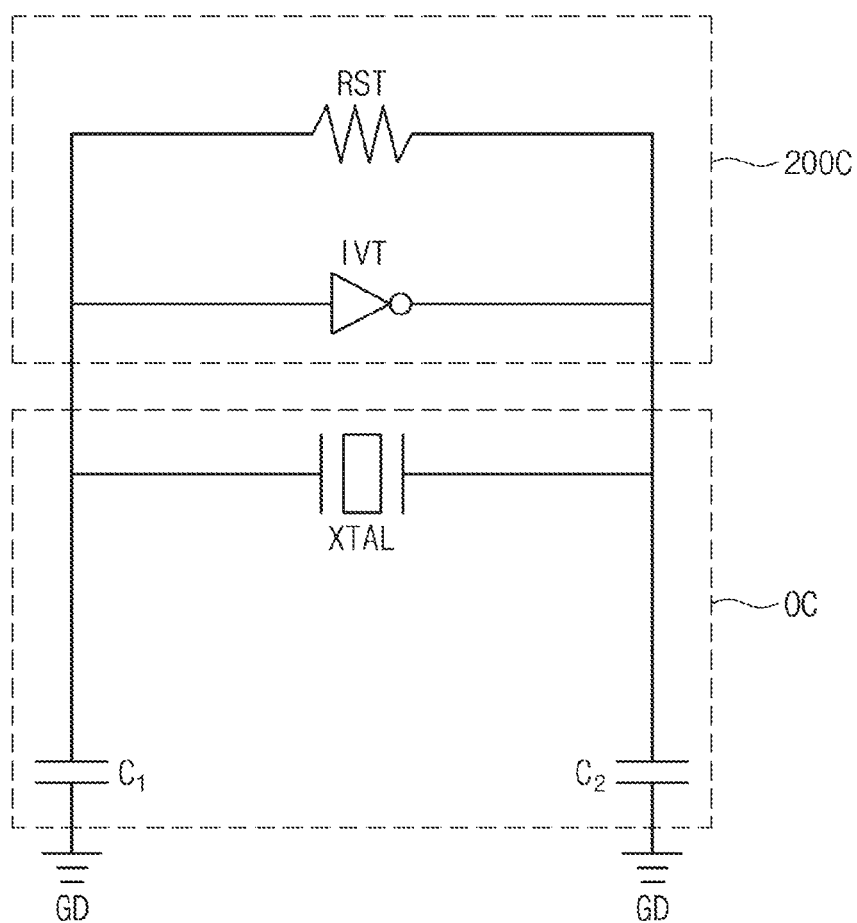
FIG. 7 is a circuit diagram of a flexible circuit film according to an embodiment of the present disclosure.
Figure 8A:
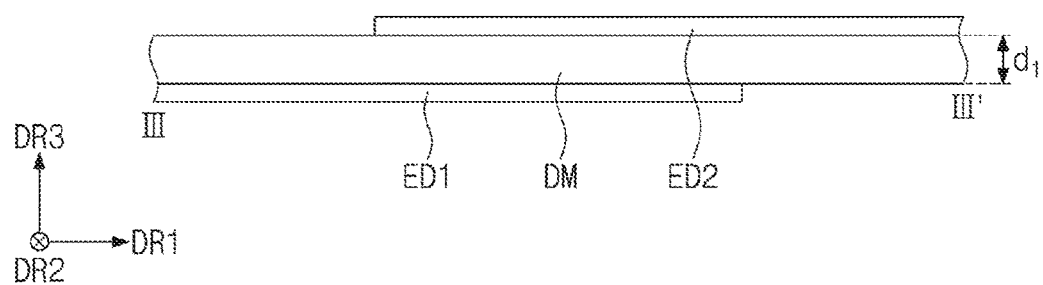
FIG. 8A is a cross-sectional view of a flexible circuit film according to an embodiment of the present disclosure.
Figure 8B:
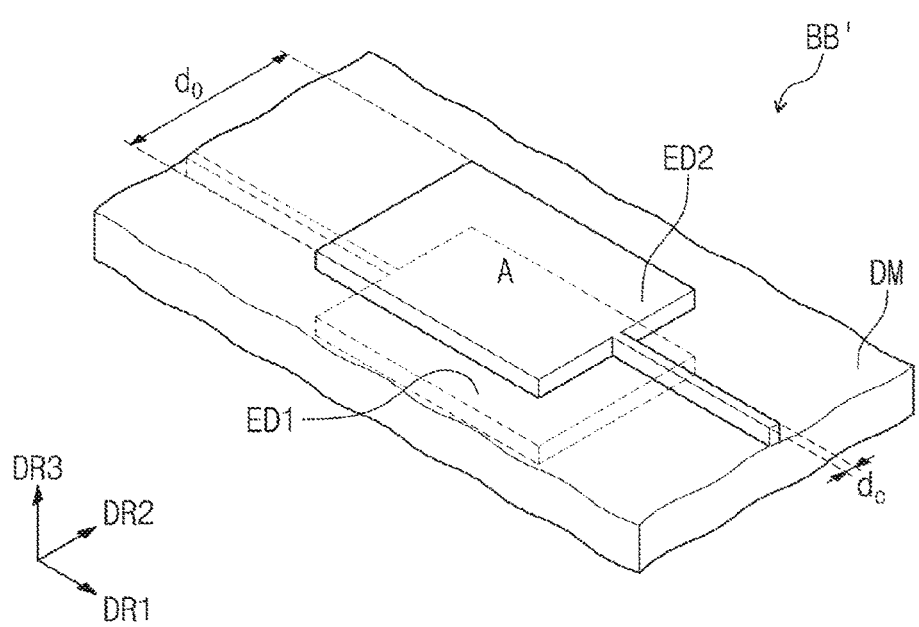
FIG. 8B is a perspective view of a flexible circuit film according to an embodiment of the present disclosure.
Figure 9A:
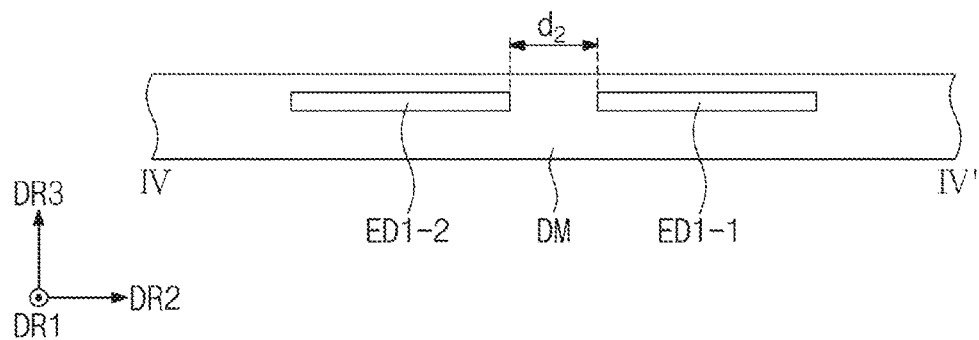
FIG. 9A is a cross-sectional view of a flexible circuit film according to an embodiment of the present disclosure.
Figure 9B:
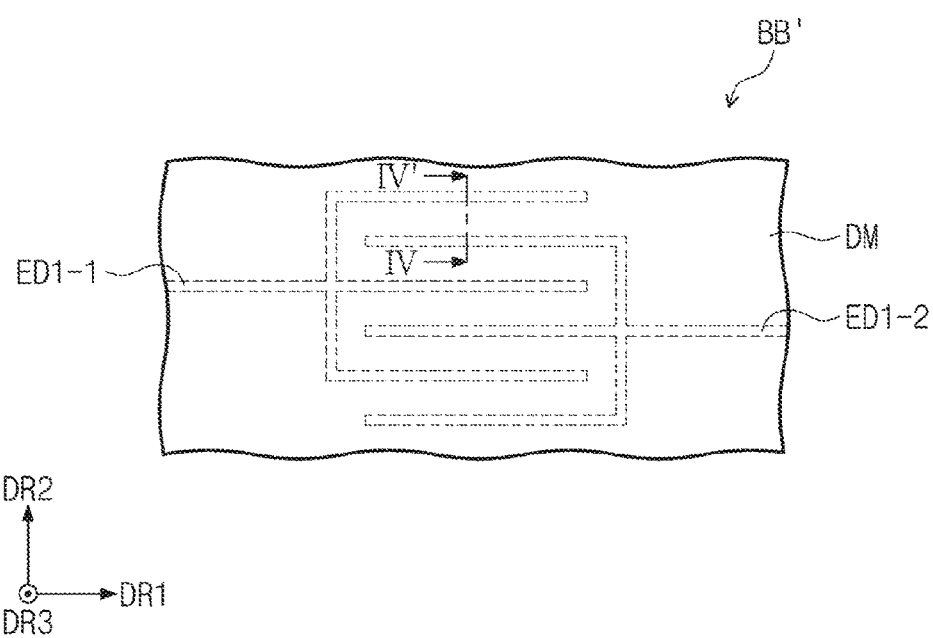
FIG. 9B is a plan view of a flexible circuit film according to an embodiment of the present disclosure.

FIG. 6 is a plan view of a display panel according to an embodiment of the present disclosure. FIG. 7 is a circuit diagram of a portion of a flexible circuit film according to an embodiment of the present disclosure. FIG. 8A is a cross-sectional view of a portion of a flexible circuit film according to an embodiment of the present disclosure. FIG. 8B is a perspective view of a portion of a flexible circuit film according to an embodiment of the present disclosure. FIG. 9A is a cross-sectional view of a portion of a flexible circuit film according to an embodiment of the present disclosure. FIG. 9B is a plan view of a portion of a flexible circuit film according to an embodiment of the present disclosure.

Referring to FIG. 6, in an embodiment, the display panel 100 includes a display region DP-DA and a non-display region DP-NDA around the display region DP-DA. The display region DP-DA and the non-display region DP-NDA are classified depending on whether a pixel PX is disposed therein. The pixel PX is disposed in the display region DP-DA. A scan driving unit SDV, a data driving unit, and a light emitting driving unit EDV are disposed in the non-display region DP-NDA. The data driving unit is a partial circuit formed in a driving chip DIC.

The display panel 100 includes a first panel region AA1, a bendable region BA, and a second panel region AA2 arranged in the second direction DR2. The second panel region AA2 and the bendable region BA are partial regions of the non-display region DP-NDA. The bendable region BA is interposed between the first panel region AA1 and the second panel region AA2.

The first panel region AA1 corresponds to the display surface DS of FIG. 1. The width (or length) of the bendable region BA and the width (or length) of the second panel region AA2 in the first direction DR1 are less than the width (or length) of the first panel region AA1 in the first direction DR1. A region that has a short length in the bending axis direction (first direction) DR1 can be bent more easily.

The display panel 100 includes a plurality of pixels PX, a plurality of scan lines SLI to SLm, a plurality of data lines DL1 to DLn, a plurality of light emitting lines EL1 to ELm, first and second control lines CSL1 and CSL2, a power line PL, and a plurality of pads PD. In this case, 'm' and 'n' are integers greater than 0. The pixels PX are connected to the scan lines SLI to SLm, the data lines DLIto DLn, and the light emitting lines EL1 to ELm.

The scan lines SLI to SLm extend in the first direction DR1 and are electrically connected to the scan driving unit SDV. The data lines DL1 to DLn extend in the second direction DR2 and are electrically connected to the driving chip DIC via the bendable region BA. The light emitting lines EL1 to ELm extend in the first direction DR1 and are electrically connected to the light emitting driving unit EDV.

The power line PL includes a portion that extends in the second direction DR2 and a portion that extends in the first direction DR1. The portion that extends in the first direction DR1 and the portion that extends in the second direction DR2 are disposed in different layers. The portion of the power line PL that extends in the second direction DR2 extends to the second panel region AA2 via the bendable region BA. The power line PL provides a first voltage to the pixels PX.

The first control line CSL1 is connected to the scan driving unit SDV, and extends toward the lower end portion of the second panel region AA2 via the bendable region BA. The second control line CSL2 is connected to the light emitting driving unit EDV, and extends toward the lower end portion of the second panel region AA2 via the bendable region BA.

When viewed in a plan view, the pads PD are disposed adjacent to a lower end portion of the second panel region AA2. The driving chip DIC, the power line PL, the first control line CSL1, and the second control line CSL2 are electrically connected to the pads PD. A flexible circuit film FCB is electrically connected to the pads PD through an anisotropic conductive adhesive layer. The flexible circuit film FCB may be referred to as a flexible circuit board.

The flexible circuit film FCB includes the sensor controller 200C, a quartz oscillator XTAL, and an electrode ED. The electrode ED includes capacitors CAP1 and CAP2, a ground GD, and a connection unit CNT.

FIG. 7 is a circuit diagram of the sensor controller 200C and an oscillation circuit OC.

Referring to FIGS. 6 and 7, in an embodiment, the sensor controller 200C includes a feedback resistor RST and an inverter IVT. The feedback resistor RST and the inverter IVT are disposed inside the sensor controller 200C, which is an integrated circuit device that receives the clock at a specific frequency.

The oscillation circuit OC includes the quartz oscillator XTAL and the capacitors CAP1 and CAP2. The capacitors CAP1 and CAP2 include the input capacitor CAP1 and the output capacitor CAP2. The capacitors CAP1 and CAP2 determine oscillation frequencies of the oscillation circuit OC. The load capacity CL of the oscillation circuit OC may be expressed as $(C1 \times C2)/(C1+C2)$, where C1 and C2 are, respectively, the capacitance of capacitor CAP1 and capacitor CAP2. The oscillation frequency of the oscillation circuit OC may be expressed as $\frac{1}{2\pi}(Le \times CL)$, where Le is the effective inductance of the quartz oscillator XTAL.

The quartz oscillator XTAL is a passive oscillation device that uses oscillation characteristics at a specific frequency that depends on a structure or shape of the quartz. The quartz oscillator XTAL can be incorporated into a circuit to control a clock signal that maintains a stable time and oscillates at regular time intervals. The quartz oscillator XTAL generates an oscillation signal at a specific frequency by connecting the sensor controller 200C and the capacitors CAP1 and CAP2. For example, the quartz oscillator XTAL is a component of the oscillation circuit OC that generates waveforms that serve as the reference frequency of the sensing signal in the input devices 2000 (see FIG. 1) along with the sensor controller 200C and capacitors CAP1 and CAP2. The quartz oscillator XTAL may be provided in the form of a chip. The accuracy of the frequency signal, which can be changed by environment factors such as the external temperature, can be increased by using the quartz oscillator XTAL.

The sensor controller 200C is electrically connected to an input terminal and an output terminal of the quartz oscillator XTAL, and provides an input signal at the input terminal and an output signal at the output terminal.

The capacitors CAP1 and CAP2 operate together with quartz oscillators XTAL and the inverter IVT and are used to match resonance values. The capacitors CAP1 and CAP2 according to embodiments of the present disclosure are not implemented using an external component, but the capacitance values of the capacitors CAP1 and CAP2 are determined using electrodes in the flexible circuit film FCB.

FIGS. 8A and 8B are enlarged cross-sectional views and perspective views that illustrate the capacitors CAP1 and CAP2 shown in FIGS. 6 and 7, respectively. FIG. 8A is a cross-sectional view taken along line III-III' of FIG. 6. FIG. 8B is an enlarged perspective view of region BB' in FIG. 6.

Referring to FIGS. 8A and 8B, in an embodiment, the flexible circuit film FCB includes a plurality of electrodes ED1 and ED2 in different layers and a dielectric DM interposed between the plurality of electrodes ED1 and ED2.

The first electrode ED1 is located at a position connected to the quartz oscillator XTAL (see FIG. 6). The first electrode ED1 is connected to the input terminal or the output terminal of the quartz oscillator XTAL (see FIG. 6). An electrode connected to the input terminal may be referred to as a first electrode, and an electrode connected to the output terminal may be referred to as a third electrode. The description about the first electrode ED1 may identically apply when describing the third electrode.

The second electrode ED2 is disposed in a different layer from the first electrode ED1 and overlaps the first electrode ED1, when viewed in a plan view. For example, the wording "when viewed in a plan view" refers to a plane parallel to the first direction DR1 and the second direction DR2 illustrated in FIG. 8B. The second electrode ED2 is connected to the ground GD (see FIG. 6). When an electrode connected to the input terminal is referred to as the first electrode and an electrode connected to the output terminal is referred to as the third electrode, an electrode that overlaps the first electrode may be referred to as a second electrode and an electrode that overlaps the third electrode may be referred to as a fourth electrode. The description of the second electrode ED2 identically applies to the fourth electrode.

The dielectric DM is, for example, a polyimide film, but embodiments of the present disclosure are not necessarily limited thereto. The ground GD (see FIG. 6) may be referred to as the ground or a ground unit.

The capacitors CAP1 and CAP2 (see FIG. 6) are defined by the first electrode ED1, the second electrode ED2 disposed on the first electrode ED1, and the dielectric DM interposed between the first electrode ED1 and the second electrode ED2. When the electrode connected to the input terminal is referred to as the first electrode and the electrode connected to the output terminal is referred to as the third electrode, an electrode that overlaps the first electrode is referred to as the second electrode and an electrode that overlaps the third electrode is referred to as the fourth electrode. The first electrode and the second electrode define the first capacitor CAP1 (refer to FIG. 6) and the third electrode and the fourth electrode define the second capacitor CAP2 (refer to FIG. 6).

A distance $d_1$ between the first electrode ED1 and the second electrode ED2, and an overlap region "A" between the first electrode ED1 and the second electrode ED2 may vary depending on the capacitance value for the applied quartz oscillator XTAL (see FIG. 6). For example, the overlap region "A" between the first electrode ED1 and the second electrode ED2 is an overlap region when viewed on a plane parallel to the first direction DR1 and the second direction DR2. The capacitance values $C_1$ and $C_2$ of the first electrode ED1 and the second electrode ED2 are in a range of 1 pF to 50 pF. For example, the capacitance values $C_1$ and $C_2$ of the first electrode ED1 and the second electrode ED2 are about 10 pF. A width dc of the connection unit CNT is, for example, 40 μm or more and 60 μm or less. A width do of the overlap part between the first electrode ED1 and the second electrode ED2 that define the capacitors CAP1 and CAP2 is, for example, at least twice the width dc of the connection unit CNT.

FIGS. 9A and 9B are an enlarged cross-sectional view and an enlarged perspective view of another example of the capacitors CAP1 and CAP2 (see FIG. 6) illustrated in FIGS. 6 and 7, respectively. FIG. 9B is an enlarged plan view of BB' region in FIG. 6. FIG. 9A is a cross-sectional view taken along line IV-IV' in FIG. 9B.

Referring to FIGS. 9A and 9B, in an embodiment, the flexible circuit film FCB includes a plurality of electrodes ED1-1 and ED1-2 in the same layer and the dielectric DM disposed between the plurality of electrodes.

The electrode ED1-1 is located at a position connected to the quartz oscillator XTAL. A (1-1)-th electrode ED1-1 is connected to an input terminal or an output terminal of the quartz oscillator XTAL. An electrode connected to the input terminal may be referred to as the (1-1)-th electrode, and an electrode connected to the output terminal may be referred to as a (2-1)-th electrode. The description of the (1-1)-th electrode ED1-1 identically applies to the (2-1)-th electrode.

The electrode ED1-2 is disposed in the same layer as the (1-1)-th electrode ED1-1, and are spaced apart from each other, when viewed on the first plane. For example, the wording "on the first plane" means "on a plane parallel to the first direction DR1 and the second direction DR2 in FIGS. 9A and 9B." Although FIGS. 9A and 9B show that the (1-1)-th electrode ED1-1 and the (1-2)-th electrode ED1-2 are spaced apart from each other in the second direction DR2, embodiments of the present disclosure are not necessarily not limited thereto and in other embodiments are spaced apart from each other in the first direction DR1.

The electrode ED1-1 and the (1-2)-th electrode ED1-2 overlap each other on a second plane perpendicular to the first plane. In FIGS. 9A and 9B, the second plane is parallel to the first direction DR1 and the third direction DR3.

The electrode ED1-2 is connected to the ground GD (see FIG. 6). When the electrode connected to the input terminal is referred to as the (1-1)-th electrode and the electrode connected to the output terminal is referred to as the (2-1)-th electrode, an electrode that overlaps the (1-1)-th electrode may be referred to as the (1-2)-th electrode, and the electrode that overlaps the (2-1)-th electrode may be referred to as a (2-2)-th electrode. The description of the (1-2)-th electrode ED1-2 identically applies to the (2-2)-th electrode.

The dielectric DM is, for example, a polyimide film, but embodiments of the present disclosure are not necessarily limited thereto.

The capacitors CAP1 and CAP2 (see FIG. 6) are defined by the electrode ED1-1, the (1-2)-th electrode ED1-2, and the dielectric DM interposed between the (1-1)-th electrodes ED1-1 and (1-2)-th electrode ED1-2. A distance d2 between the (1-1)-th electrode ED1-1 and the (1-2)-th electrode ED1-2 and an overlap part between the (1-1)-th electrode ED1-1 and the (1-2)-th electrode ED1-2 can vary depending on a capacitance value for the applied quartz oscillator XTAL (see FIG. 6). The capacitance values C1 and C2 of the (1-1)-th electrode ED1-1 and the (1-2)-th electrode ED1-2 are in a range of 1 pF to 50 pF. For example, the capacitance values C1 and C2 of the (1-1)-th electrode ED1-1 and the (1-2)-th electrode ED1-2 are about 10 pF.

As illustrated in FIG. 9B, the (1-1)-th electrode ED1-1 and the (1-2)-th electrode ED1-2 have multiple parts and are alternately arranged to overlap each other. Although FIG. 9B illustrates that each of the (1-1)-th electrode ED1-1 and the (1-2)-th electrode ED1-2 is includes three parts, embodiments are not necessarily limited thereto, and in other embodiments, each of the (1-1)-th electrode ED1-1 and the (1-2)-th electrode ED1-2 may be one part, or may include two or four or more parts that are alternately disposed.

As illustrated in FIGS. 8A to 9B, in the flexible circuit film FCB according to embodiments of the present disclosure, as a plurality of electrodes disposed in different layers or the same layer define capacitors CAP1 and CAP2 (see FIG. 6), a separate component that serves as a capacitor is not used. Accordingly, the number of components in the flexible circuit film FCB can be reduced, and thus costs can be reduced.

Figure 10A:
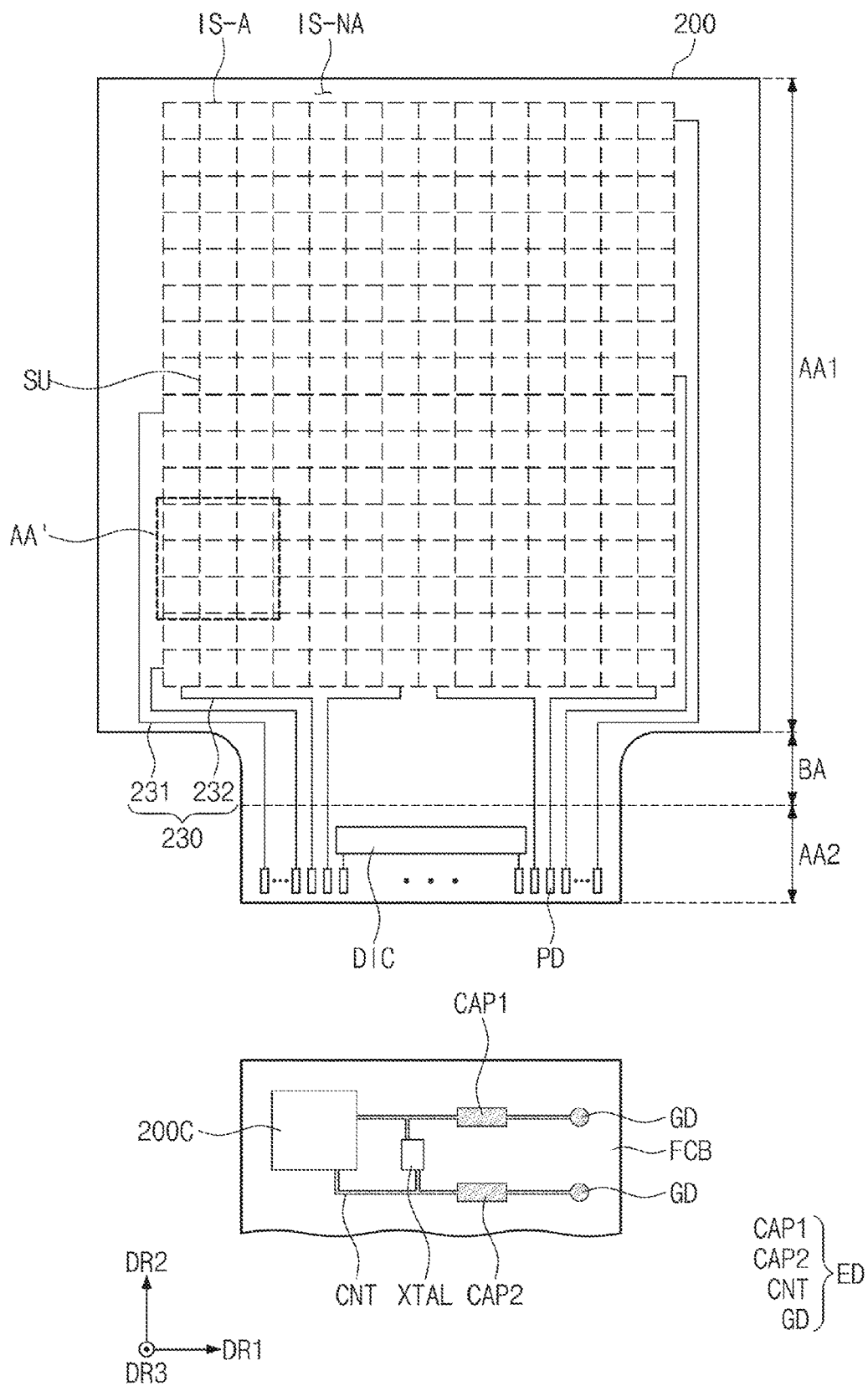
FIG. 10A is a plan view of an input sensor according to an embodiment of the present disclosure.
Figure 10B:
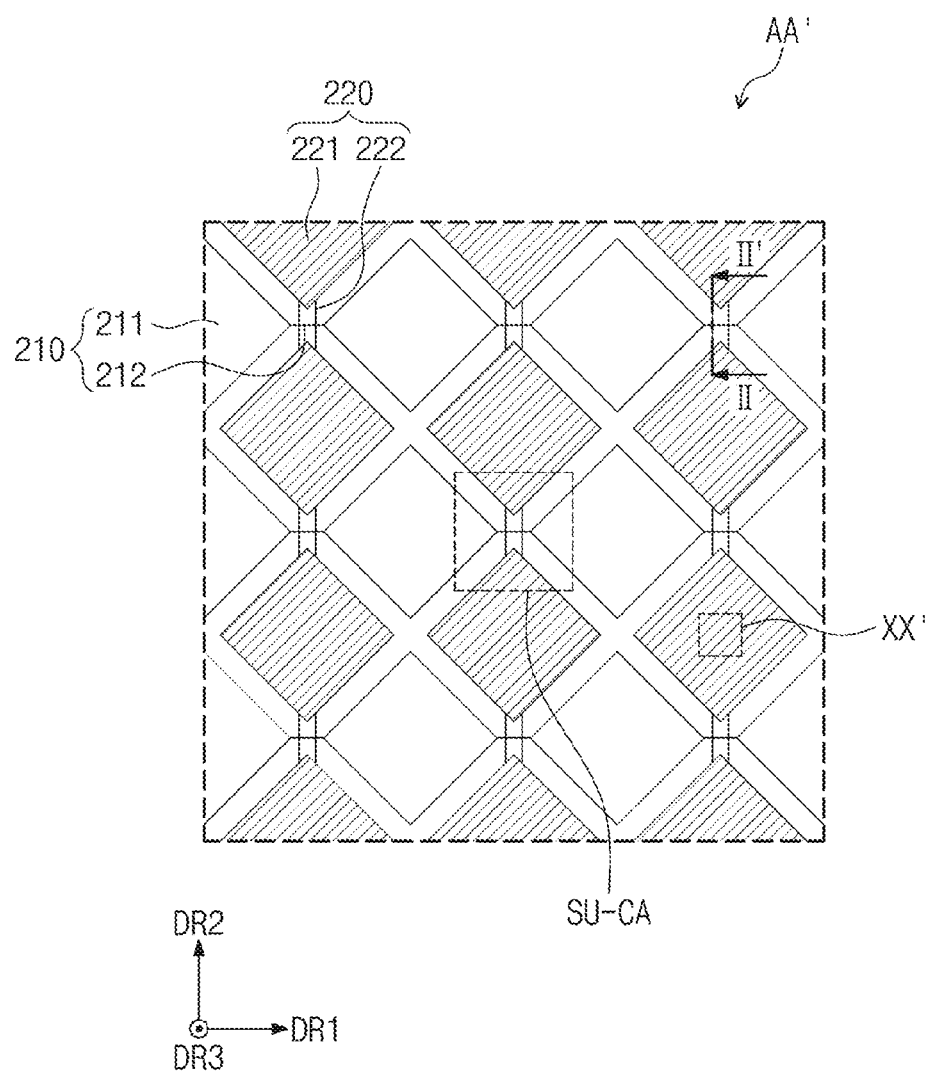
FIGS. 10B and 10C are enlarged plan views of an input sensor according to an embodiment of the present disclosure.
Figure 10C:
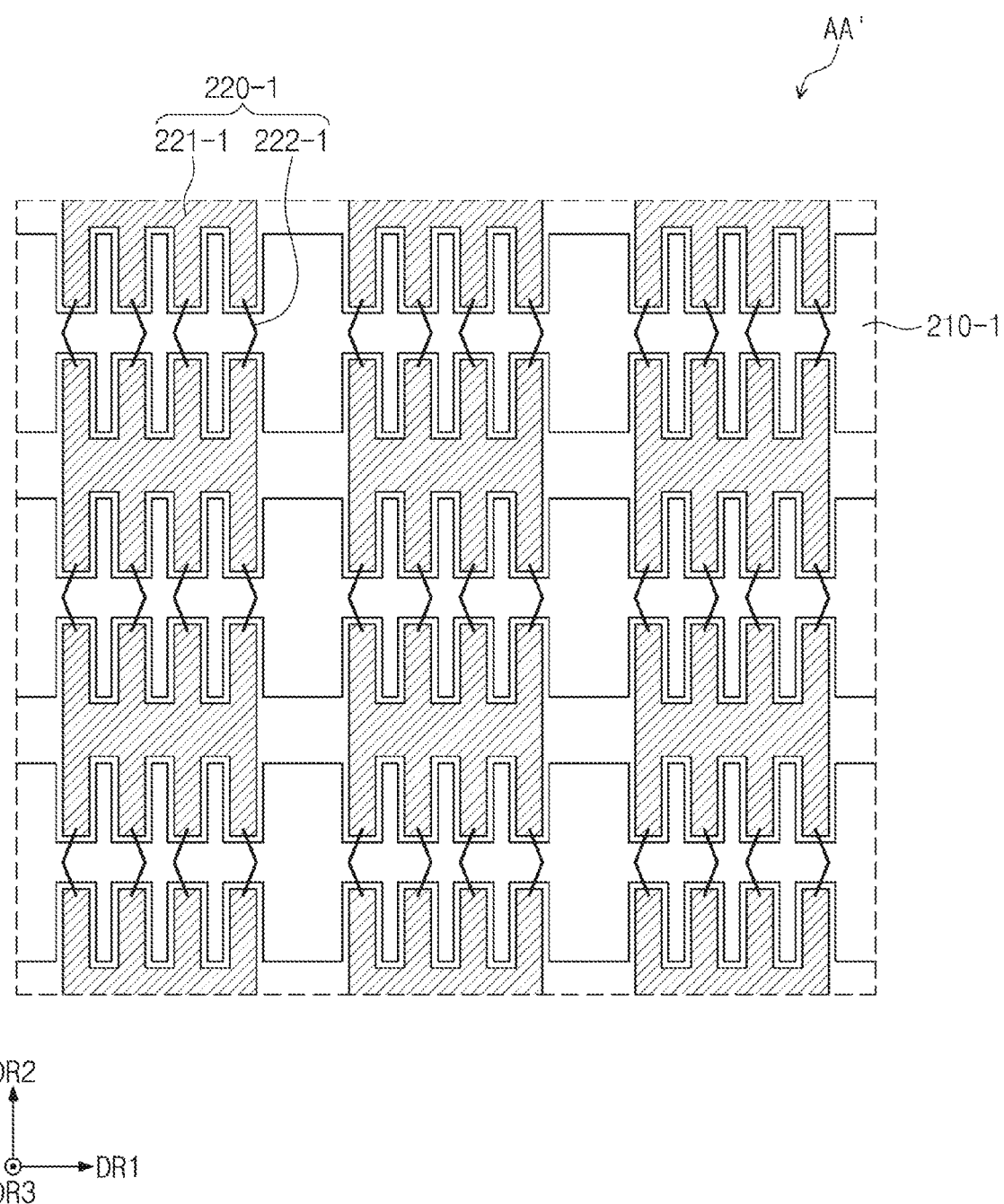

FIG. 10A is a plan view of an input sensor according to an embodiment of the present disclosure. FIGS. 10B and 10C are enlarged plan views of a portion of an input sensor according to an embodiment of the present disclosure. FIGS.

Figure 12:
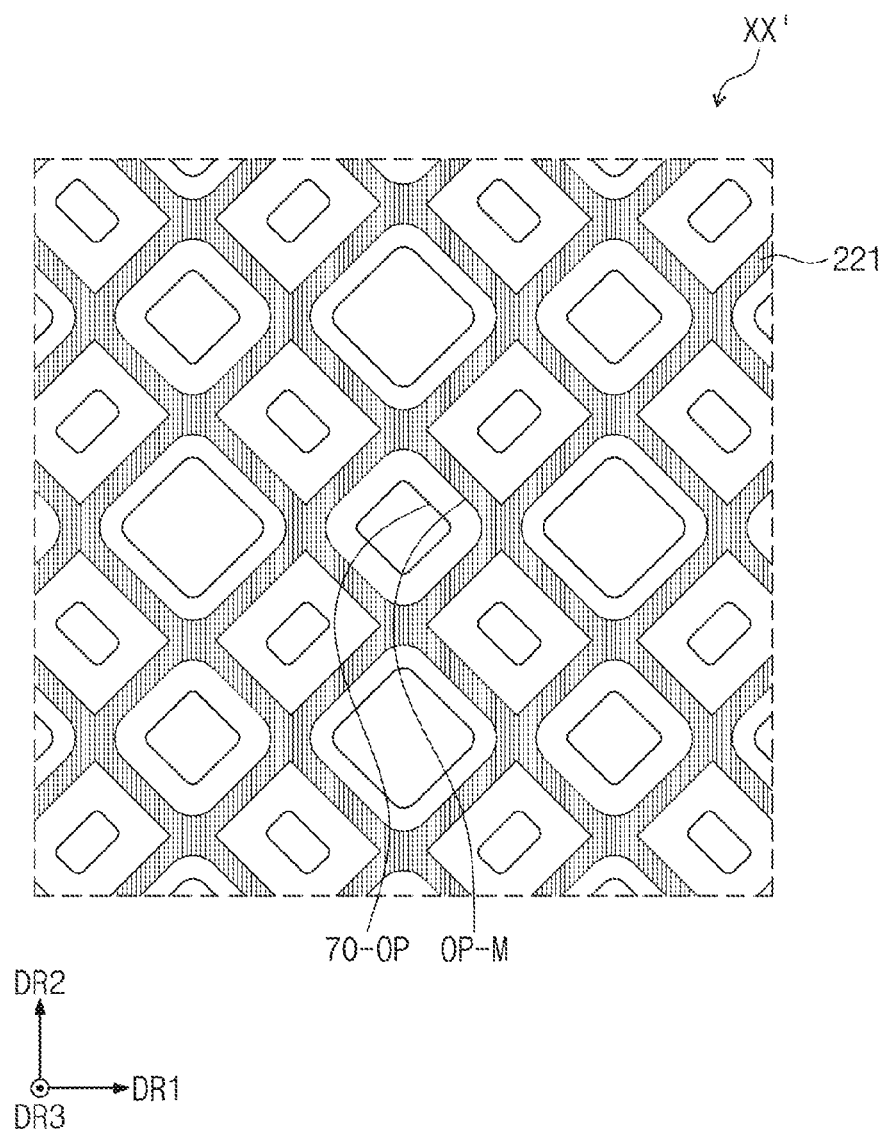
FIGS. 12 and 13 are enlarged plan views of an input sensor according to an embodiment of the present disclosure.
Figure 13:
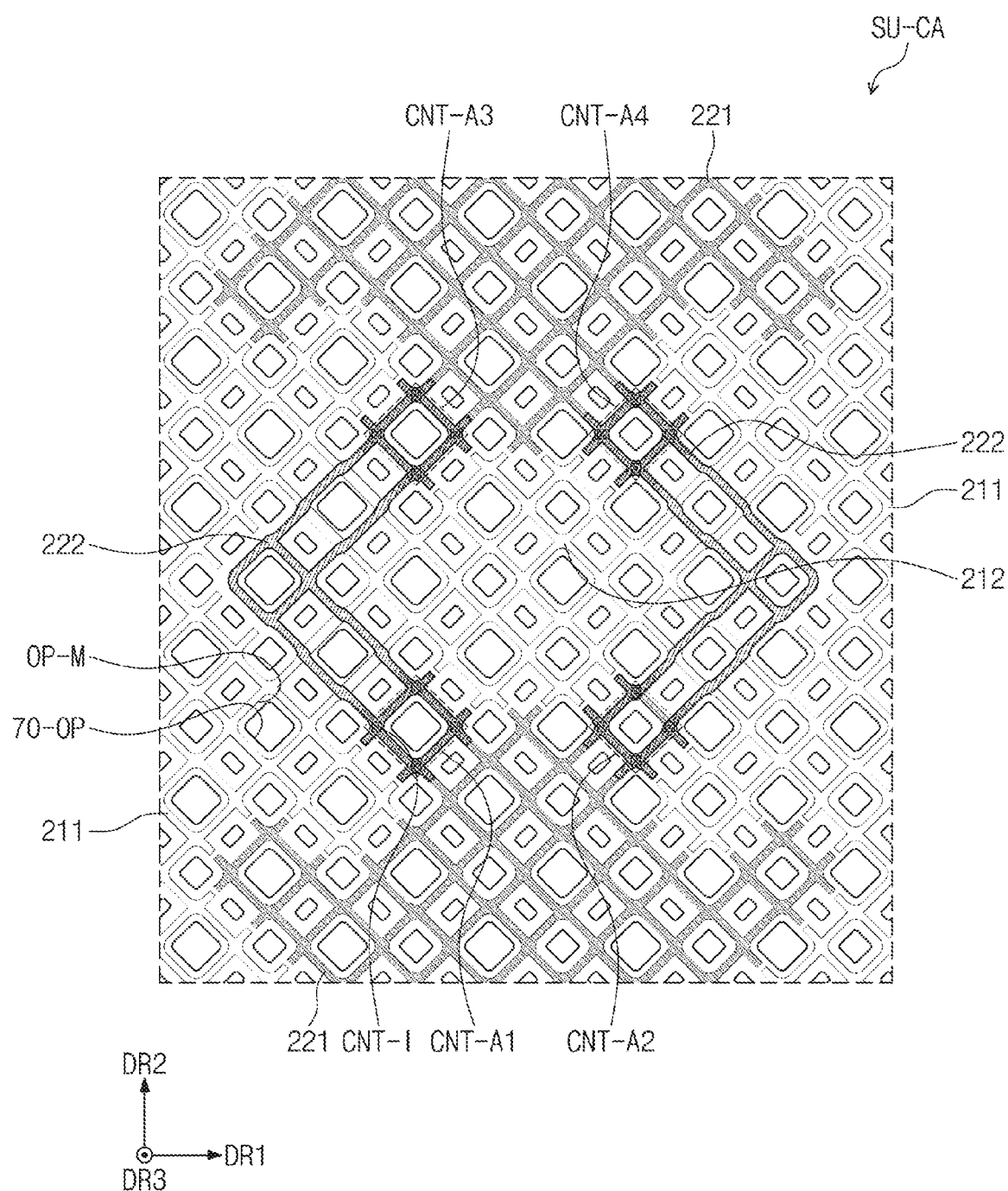

11A and 11B are cross-sectional views of an input sensor according to an embodiment of the present disclosure. FIGS. 12 and 13 are enlarged plan views of a portion of an input sensor according to an embodiment of the present disclosure.

FIGS. 10B and 10C are enlarged plan views of region AA' illustrated in FIG. 10A.

Referring to FIGS. 10A and 10B, in an embodiment, the input sensor 200 includes a sensing region IS-A and a peripheral region IS-NA. The sensing region IS-A is activated in response to an electrical signal. For example, the sensing region IS-A can sense an external input. The peripheral region IS-NA ise adjacent to the sensing region IS-A and surrounds the sensing region IS-A.

The input sensor 200 includes electrodes 210, crossing electrodes 220, and sensing lines 230. The electrodes 210 and the crossing electrodes 220 are disposed in the sensing region IS-A, and the sensing lines 230 are disposed in the peripheral region IS-NA. The input sensor 200 obtains information about an external input through a change in mutual capacitance between the electrodes 210 and the crossing electrodes 220.

The input sensor 200 includes a plurality of sensing units SU. Each of the plurality of sensing units SU is a crossing region between one of the electrodes 210 and one of the crossing electrodes 220.

Each of the electrodes 210 extends in the first direction DR1, and the electrodes 210 are arranged in the second direction DR2. The electrodes 210 include first parts 211 and second parts 212. Each second part 212 is adjacent to two adjacent first parts 211.

The crossing electrodes 220 are arranged in the first direction DR1, and each of the crossing electrodes 220 extends in the second direction DR2. The crossing electrodes 220 include patterns 221 and connection patterns 222 (or bridge patterns). The connection patterns 222 electrically connect two adjacent patterns 221. Two adjacent patterns 221 are connected to each other by two connection patterns 222, but embodiments of the present disclosure are not limited thereto. The second part 212 crosses the two connection patterns 222 while being insulated from the two connection patterns 222.

The patterns 221, the first parts 211, and the second parts 212 are disposed in the same layer, and the connection patterns 222 are disposed in different layers from the patterns 221, the first parts 211, and the second parts 212. For example, the patterns 221, the first parts 211, and the second parts 212 are included in the second conductive layer 204 (see FIG. 5), and the connection patterns 222 are included in the first conductive layer 202 (see FIG. 5), which may be referred to as a bottom bridge structure. However, embodiments of the present disclosure are not necessarily limited thereto. In some embodiments, for example, the patterns 221, the first parts 211, and the second parts 212 are included in the first conductive layer 202 (see FIG. 5), and the connection patterns 222 are included in the second conductive layer 204 (see FIG. 5), which may be referred to as a top bridge structure.

The shape of the electrodes 210 and the crossing electrodes 220 illustrated in FIG. 10B and the arrangement relationship between the electrodes 210 and the crossing electrodes 220 illustrated in FIG. 10B are shown for illustrative purposes, and the shape of the electrodes 210 and the crossing electrodes 220 of the input sensor 200, and the arrangement relationship between the electrodes 210 and the crossing electrodes 220 are not necessarily limited to those illustrated in FIG. 10B.

The sensing lines 230 are electrically connected to corresponding pads of the pads PD. The sensing lines 230 include lines 231 and crossing lines 232.

The lines 231 are electrically connected to corresponding electrodes 210. Some of the lines 231 are connected to the left side of a portion of the electrodes 210, and some of the lines 231 are connected to the right side of another portion of the electrodes 210. The crossing lines 232 are electrically connected to corresponding crossing electrodes 220. However, the connection relationship between the lines 231 and the electrodes 210 and the connection relationship between the crossing lines 232 and the crossing electrodes 220 are not necessarily limited to the example illustrated in FIG. 10A.

The sensor controller 200C is electrically connected to the input sensor 200 and provides a driving signal to the input sensor 200 and calculates coordinates from an external input. The sensor controller 200C is implemented in a chip form and mounted on the flexible circuit film FCB. The flexible circuit film FCB is electrically connected to the pads PD through an anisotropic conductive adhesive layer. The sensor controller 200C is electrically connected to the lines 231 and the crossing lines 232 through the pads PD.

FIG. 10C illustrates electrodes 210-1 and crossing electrodes 220-1 that have different shapes from those of FIG. 10B. The electrodes 210-1 and the crossing electrodes 220-1 have a bar shape.

Each of the electrodes 210-1 extends in the first direction DR1, and the electrodes 210-1 are arranged in the second direction DR2. The crossing electrodes 220-1 are arranged in the first direction DR1, and each of the crossing electrodes 220-1 extends in the second direction DR2. The crossing electrodes 220-1 include patterns 221-1 and connection patterns 222-1 (or bridge patterns). The connection patterns 222-1 electrically connect two adjacent patterns 221-1. Two adjacent patterns 221-1 are connected to each other by two connection patterns 222-1, but embodiments of the present disclosure are not necessarily limited thereto. One electrode 210-1 crosses two connection patterns 222 while being insulated from the two connection patterns 222. Although FIG. 10C shows that the electrodes 210-1 and the patterns 221-1 are engaged with each other, embodiments of the present disclosure are not necessarily limited thereto.

Each of the electrodes 210 or 210-1 and the crossing electrodes 220 or 220-1 described with reference to FIGS. 10B and 10C have a mesh structure. For example, an opening is formed in each of the electrodes 210 or 210-1 and the crossing electrodes 220 or 220-1. However, embodiments of the present disclosure are not necessarily limited thereto, and in some embodiments, each of the electrodes 210 or 210-1 and the crossing electrodes 220 or 220-1 is a transparent electrode that does not have an opening formed therein.

Figure 11A:
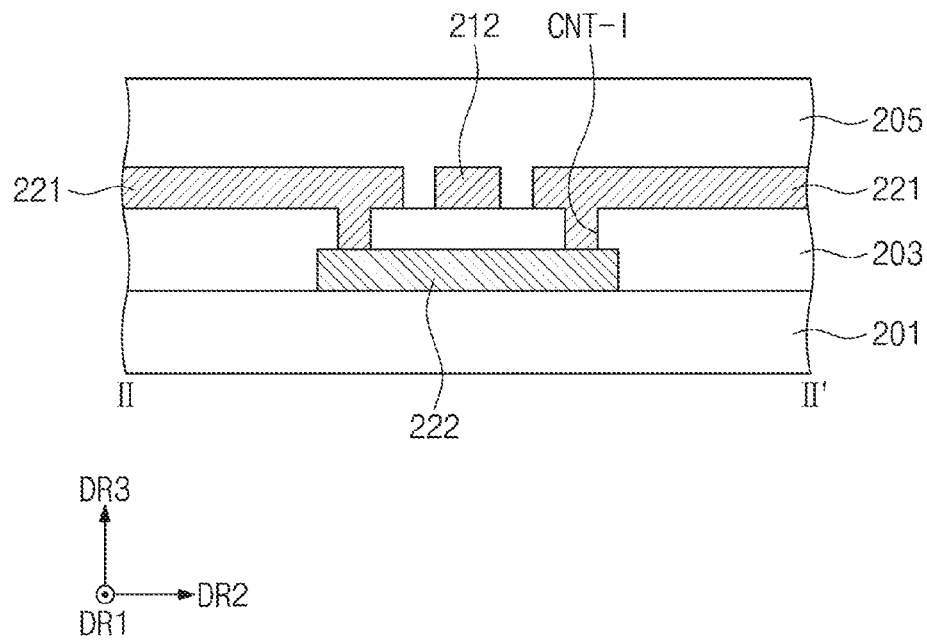
FIGS. 11A and 11B are cross-sectional views of an input sensor according to an embodiment of the present disclosure.
Figure 11B:
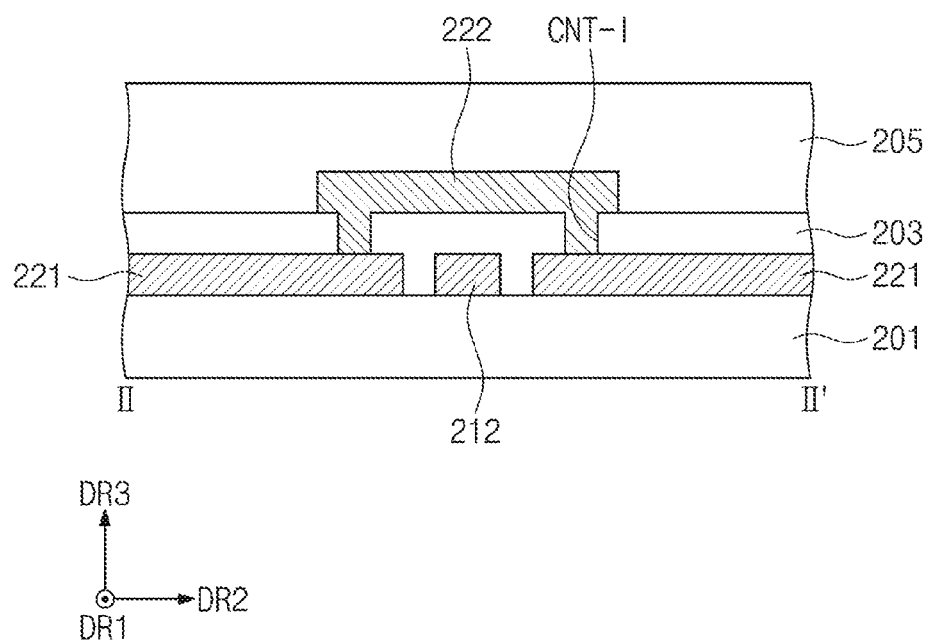

FIGS. 11A and 11B are cross-sectional views taken along line II-II' in FIG. 10B, respectively.

Referring to FIGS. 10B and 11A, in an embodiment, as described above, the input sensor 200 has a bottom bridge structure. For example, bridge patterns 222 are included in the first conductive layer 202 (see FIG. 5), and the first parts 211, the second parts 212, and the patterns 221 may be included in the second conductive layer 204 (see FIG. 5). The patterns 221 are connected to the bridge patterns 222 through a contact hole CNT-I that penetrates through the sensing insulating layer 203.

Referring to FIGS. 10B and 11B, in an embodiment, as described above, the input sensor 200 has a top bridge structure. For example, the bridge patterns 222 are included in the second conductive layer 204 (see FIG. 5), and the first parts 211, the second parts 212, and the patterns 221 are included in the first conductive layer 202 (see FIG. 5). The bridge patterns 222 are connected to the patterns 221 through a contact hole CNT-I that penetrates through the sensing insulating layer 203.

FIG. 12 is an enlarged plan view illustrating region XX' in FIG. 10B.

Referring to FIGS. 10B and 12, in an embodiment, the patterns 221 have a mesh structure. An opening OP-M is formed in the patterns 221. One opening OP-M overlaps the opening 70-OP in the pixel defining layer 70 (see FIG. 5). However, this is shown for illustrative purposes, and the opening OP-M may overlap a plurality of openings 70-OP. Each of the bridge patterns 222, the first parts 211, and the second parts 212 has a mesh structure similar to that of the patterns 221.

FIG. 13 is a plan view of region SU-CA illustrated in FIG. 10B.

Referring to FIGS. 10B and 13, in an embodiment, each of sensing units SU (see FIG. 10A) includes a corresponding crossing region SU-CA of cross regions of the electrodes 210 and the crossing electrodes 220. The bridge patterns 222 are located in the crossing region SU-CA.

Two bridge patterns 222 connect two patterns 221 to each other. First to fourth connection regions CNT-A1, CNT-A2, CNT-A3, and CNT-A4 are interposed between two bridge patterns 222 and the two patterns 221. Four contact holes CNT-I are formed in the first to fourth connection regions CNT-A1, CNT-A2, CNT-A3, and CNT-A4. However, this is shown for illustrative purposes, and in some embodiments, the two patterns 221 are electrically connected each other through one bridge pattern. In addition, according to some embodiments of the present disclosure, two patterns 221 are electrically connected to each other through three or more bridge patterns.

Figure 14:
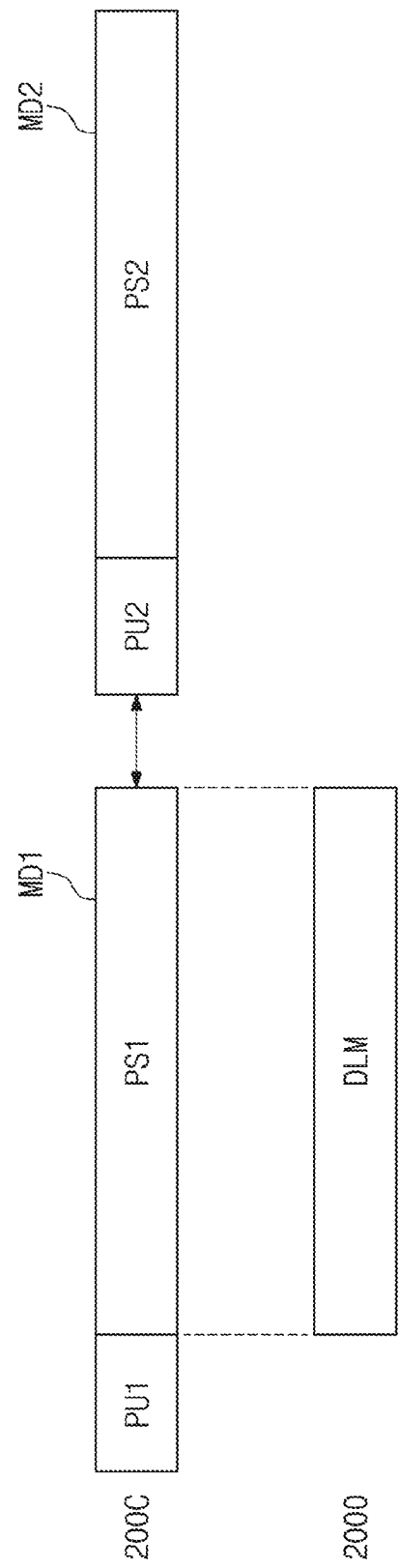
FIG. 14 illustrates operations of a first mode and a second mode according to an embodiment of the present disclosure.

FIG. 14 illustrates operations in a first mode and a second mode according to an embodiment of the present disclosure.

Referring to FIGS. 3 and 14, the sensor controller 200C operates in a first mode MD1 that detects the first input from the input device 2000, or a second mode MD2 that detects the second input from the user's body 3000.

The first mode MD1 includes a first section PU1 and a second section PS1. The second section PS1 follows the first section PU1. The first section PU1 is an uplink section that transmits the uplink signal ULS from the input sensor 200 to the input device 2000. The second section PS1 is a downlink section in which the input sensor 200 receives the downlink signal DLS from the input device 2000. The input sensor 200 senses the first input of the input device 2000 based on the downlink signal DLS.

The input device 2000 transmits the downlink signal DLS to the sensor controller 200C during a downlink period DLM.

The sensor controller 200C operates in the second mode MD2 after the first mode MD1 is terminated. The first mode MD1 and the second mode MD2 are alternately performed.

The second mode MD2 includes a first section PU2 and a second section PS2. The second section PS2 follows the first section PU2. The first section PU2 is an uplink section that transmits the uplink signal ULS to the input sensor 200. The second section PS2 of the sensor controller 200C is for sensing the second input from the user's body 3000.

The input device 2000 transmits a signal to the input sensor 200 in response to the uplink signal ULS. When the sensor controller 200C receives the response signal from the input sensor 200 in the first section PU1 or PU2, the sensor controller 200C operates in the second section PS1 of the first mode MD1. When the sensor controller 200C does not receive the response signal from the input device 2000 in the first section PU2, the sensor controller 200C operates in the second section PS2 of the second mode MD2. Therefore, the input sensor 200 periodically monitors whether the input device 2000 is detected, and can detect the first input from the input device 2000. However, this is shown for illustrative purposes, and the operation of the sensor controller 200C is not necessarily limited.

As described above, according to an electronic device of an embodiment of the present disclosure, the capacitor that constitutes an oscillation circuit is formed using an electrode in a flexible printed circuit, instead of using an additional part, thereby simplifying parts.

While embodiments of the present disclosure have been described with reference to drawings thereof, it will be apparent to those of ordinary skill in the art that various changes and modifications may be made thereto without departing from the spirit and scope of the present disclosure as set forth in the following claims.

What is claimed is:

1. An electronic device, comprising:
a display panel that displays an image;
an input sensor disposed on the display panel and that senses an input from an input device; and
a flexible circuit film that includes a sensor controller that drives the input sensor, and an oscillation circuit connected to the sensor controller and that generates a reference waveform that senses the input from the input device,
wherein the oscillation circuit includes:
a quartz oscillator that is connected to the sensor controller and that includes a first terminal and a second terminal;
a first electrode connected to the first terminal of the quartz oscillator; and
a second electrode disposed in a different layer from the first electrode and that overlaps the first electrode, and
wherein the first electrode and the second electrode constitute a first capacitor.

2. The electronic device of claim 1, wherein the oscillation circuit includes:
a third electrode connected to the second terminal of the quartz oscillator; and
a fourth electrode disposed in a different layer from the third electrode and that overlaps the third electrode, and
wherein the third electrode and the fourth electrode constitute a second capacitor.

3. The electronic device of claim 2, wherein the oscillation circuit further includes a dielectric interposed between the first electrode and the second electrode, and between the third electrode and the fourth electrode.

4. The electronic device of claim 2, wherein each of the second electrode and the fourth electrode are connected to ground.

5. The electronic device of claim 2, wherein capacitance values of each of the first capacitor and the second capacitor are in a range from 1 pF to 50 pF.

6. The electronic device of claim 1, wherein the first terminal of the quartz oscillator is an input terminal that receives an input signal from the sensor controller.

7. The electronic device of claim 1, wherein the second terminal of the quartz oscillator is an output terminal that provides an output signal to the sensor controller.

8. An electronic device, comprising:
a display panel that displays an image;
an input sensor disposed on the display panel and that senses an input from an input device; and
a flexible circuit film that includes a sensor controller that drives the input sensor, and an oscillation circuit connected to the sensor controller and that generates a reference waveform that senses the input from the input device,
wherein the oscillation circuit includes:
a quartz oscillator connected to the sensor controller and that includes a first terminal and a second terminal;
a (1-1)-th electrode connected to the first terminal of the quartz oscillator; and
a (1-2)-th electrode disposed in a same layer as the (1-1)-th electrode and spaced apart from the (1-1)-th electrode on a first plane perpendicular to a first direction, and
wherein the (1-1)-th electrode and (1-2)-th electrode overlap each other on a second plane parallel to the first direction and constitute a first capacitor.

9. The electronic device of claim 8,
wherein the (1-1)-th electrode includes a plurality of (1-1)-th branch electrodes,
wherein the (1-2)-th electrode includes a plurality of (1-2)-th branch electrodes, and
wherein the plurality of (1-1)-th branch electrodes and the plurality of (1-2)-th branch electrodes are spaced apart from each other and are alternately arranged on the first plane.

10. The electronic device of claim 9, wherein the plurality of (1-1)-th branch electrodes and the plurality of (1-2)-th branch electrodes overlap each other on the second plane.

11. The electronic device of claim 8, wherein the oscillation circuit further includes:
a (2-1)-th electrode connected to the second terminal of the quartz oscillator; and
a (2-2)-th electrode disposed in a sane layer as the (2-1)-th electrode and spaced apart from the (2-1)-th electrode, when viewed in a plan view, and
wherein the (2-1)-th electrode and the (2-2)-th electrode constitute a second capacitor.

12. The electronic device of claim 11, wherein each of the (1-2)-th electrode and the (2-2)-th electrode are connected to ground.

13. The electronic device of claim 11, wherein the oscillation circuit further includes a dielectric interposed between the (1-1)-th electrode and the (1-2)-th electrode, and between the (2-1)-th electrode and the (2-2)-th electrode.

14. The electronic device of claim 11, wherein capacitance values of each of the first capacitor and the second capacitor are in a range from 1 pF to 50 pF.

15. The electronic device of claim 8, wherein the first terminal of the quartz oscillator is an input terminal that receives an input signal from the sensor controller.

16. The electronic device of claim 8, wherein the second terminal of the quartz oscillator is an output terminal that provides an output signal to the sensor controller.

17. An electronic device, comprising:
a display panel that displays an image;
an input sensor disposed on the display panel and that senses an input from an input device;
a sensor controller that drives the input sensor;
a quartz oscillator connected to the sensor controller and that includes an input terminal and an output terminal;
a first capacitor connected to the input terminal of the quartz oscillator;
a second capacitor connected to the output terminal of the quartz oscillator; and
a ground,
wherein the first capacitor includes a first electrode connected to the input terminal and a second electrode connected to the ground, and
wherein the second capacitor includes a third electrode connected to the output terminal and a fourth electrode connected to the ground.

18. The electronic device of claim 17,
wherein the first electrode and the second electrode are disposed in mutually different layers and overlap in a plan view, and
wherein the third electrode and the fourth electrode are disposed in mutually different layers and overlap each other when viewed in in a plan view.

19. The electronic device of claim 17,
wherein the first electrode and the second electrode are disposed in a same layer and are spaced apart from each other when viewed in a plan view, and
wherein the third electrode and the fourth electrode are disposed in a same layer, and are spaced apart from each other when viewed in a plan view.

20. The electronic device of claim 17, wherein values of each of the first capacitor and the second capacitor are in a range from 1 pF to 50 pF.

* * * * *